(12) United States Patent
Chopra et al.

(10) Patent No.: US 9,981,247 B2
(45) Date of Patent: May 29, 2018

(54) MULTIFUNCTIONAL AND STABLE NANO-ARCHITECTURES CONTAINING NANOCARBON AND NANO- OR MICRO STRUCTURES AND A CALCINED HYDROTALCITE SHELL

(71) Applicant: SABIC Global Technologies B.V., Bergen op Zoom (NL)

(72) Inventors: Nitin Chopra, Sugar Land, TX (US); James Lowrey, Sugar Land, TX (US); Ihab N. Odeh, Sugar Land, TX (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days. days.

(21) Appl. No.: 15/534,858

(22) PCT Filed: Nov. 9, 2016

(86) PCT No.: PCT/IB2016/056760
§ 371 (c)(1),
(2) Date: Jun. 9, 2017

(87) PCT Pub. No.: WO2017/081631
PCT Pub. Date: May 18, 2017

(65) Prior Publication Data
US 2017/0368535 A1    Dec. 28, 2017

Related U.S. Application Data

(60) Provisional application No. 62/253,837, filed on Nov. 11, 2015, provisional application No. 62/418,498, filed on Nov. 7, 2016.

(51) Int. Cl.
*C01B 32/182* (2017.01)
*B01J 21/18* (2006.01)
(Continued)

(52) U.S. Cl.
CPC .............. *B01J 21/18* (2013.01); *B01J 23/14* (2013.01); *B01J 23/42* (2013.01); *B01J 23/44* (2013.01); *B01J 23/52* (2013.01); *B01J 35/026* (2013.01)

(58) Field of Classification Search
CPC ... B01J 21/18; B01J 23/06; B01J 23/14; B01J 23/16; B01J 23/42; B01J 23/44;
(Continued)

(56) References Cited

U.S. PATENT DOCUMENTS

2010/0143798 A1* 6/2010 Zhamu ................. H01M 4/133
429/212
2012/0228555 A1* 9/2012 Cheng .................... B82Y 30/00
252/503

(Continued)

FOREIGN PATENT DOCUMENTS

CN    103191746 A    7/2013
CN    102764618 B    6/2014
(Continued)

OTHER PUBLICATIONS

"Controlled assembly of graphene shells encapsulated gold nanoparticles and their integration with carbon nanotubes," Nitin Chopra et al. Carbon 62 (2013), pp. 76-87.*
(Continued)

*Primary Examiner* — Patricia L. Hailey
(74) *Attorney, Agent, or Firm* — Norton Rose Fulbright US LLP

(57) ABSTRACT

Methods for making a multilevel core-shell structure having a core/graphene-based shell structure are described. A method for making a core/graphene-based shell structure can include obtaining a composition that includes core nano- or microstructures and graphene-based structures having at least a portion of a surface coated with a curable organic
(Continued)

material, where the core nano- or microstructures and graphene-based structures are dispersed throughout the composition and subjecting the composition to conditions that cure the organic material and allow the graphene-based structures to self-assemble around the core nano- or microstructures to produce a core/graphene-based shell structure that has a graphene-based shell encompassing a core nano- or microstructure.

20 Claims, 15 Drawing Sheets

(51) Int. Cl.
  *B01J 23/14* (2006.01)
  *B01J 23/42* (2006.01)
  *B01J 23/44* (2006.01)
  *B01J 23/52* (2006.01)
  *B01J 35/02* (2006.01)
(58) Field of Classification Search
  CPC . B01J 23/46; B01J 23/48; B01J 35/026; B01J 35/0073; B01J 35/008; B01J 35/0086; B01J 37/084; C01B 32/182; C01B 2204/00–2204/32; C08K 3/042; C01P 2002/22; C01F 7/005
  USPC ........ 502/183–185; 428/357, 367, 368, 408; 977/734, 883
  See application file for complete search history.

(56) References Cited

U.S. PATENT DOCUMENTS

| | | | |
|---|---|---|---|
| 2012/0288433 A1* | 11/2012 | Sutter .................... | B82Y 30/00 423/445 B |
| 2014/0023939 A1* | 1/2014 | Chen ................... | H01M 4/9016 429/405 |
| 2014/0087939 A1* | 3/2014 | Kim ..................... | B01J 37/0244 502/185 |
| 2014/0234157 A1* | 8/2014 | Chen ........................ | H01B 1/02 420/507 |
| 2016/0108517 A1* | 4/2016 | Menceloglu ............. | B01J 13/14 427/457 |
| 2016/0152819 A1* | 6/2016 | Balijepalli ............. | C09J 163/00 523/456 |
| 2017/0141387 A1* | 5/2017 | Hayner ................. | H01M 4/134 |

FOREIGN PATENT DOCUMENTS

| | | | |
|---|---|---|---|
| CN | 104815685 A | 8/2015 | |
| CN | 104843805 A | 8/2015 | |
| JP | 2013-094771 | * 5/2013 | .............. B01J 23/89 |
| JP | 2017-095329 | * 6/2017 | .............. C01B 32/15 |
| WO | WO 2015016650 | 2/2015 | |

OTHER PUBLICATIONS

"Preparation and enhanced photocatalytic activity of CdS@RGO core-shell structural microspheres," Hui Liu et al. Applied Surface Science 305 (2014), pp. 242-246.*
International Search Report and Written Opinion for PCT/IB2016/056760 dated Feb. 14, 2017.
Chen et al., *ACS Applied Materials & Interfaces*, 4, 4398-4404 (2012).
Choi et al., *Carbon*, 79, 58-66 (2014).
Herman et al., *RSC Adv.*, 5, 51371-51381 (2015).
Li et al., *Phys. Chem. Chem. Phys.*, 17, 12881-12893 (2015).
Tang et al., *Nanoscale*, 7, 9133-9139 (2015).
Zhou et al., *Energy Environ. Sci.*, 4, 4954-4961 (2011).
Bianco et al., *Carbon*, 65, 1-6 (2013).
Gu et al., *Chem. Commun.*, 51, 3024-3036 (2015).
Zhang et al., *Scientific Reports*, 4, 4053 (2014).
Agnoli et al., Surface Science, 2013, 609, 1-5.
Deng at al., Applied Physics Letters, 2015, 106, 203108.
Gong et al., *Environ. Sci. Technol.*, 45(14), 6181-6187 (2011).
Hong et al., Journal of Physical Chemistry Letters, 2010, 1, 3442-3445.
Jiang et al., ACS Catalysis, 2015, 5, 438-447.
Kim et al., *New Journal of Chemistry*, 38, 1606-1610 (2014).
Li et al., Langmuir, 2015, 31, 5164-5173.
Li et al., Nano Letters, 2014, 14, 7085-7089.
Maiti et al., Advanced Materials, 2014, 26, 40-67.
Schaetz et al., ACS Catalysis, 2012, 2, 1267-1284.
Sergiienko et al., *Acta Materialia*, 55(11), 3671-3680 (2007).
Siddiqi et al., Journal of Catalysis, 2010, 274, 200-206.
Sun et al., Journal of Catalysis, 2010, 274, 192-199.
Weckhuysen et al., Catalysis Today, 1999, 51, 223-232.
Wu et al., Journal of Physical Chemistry C, 2012, 116, 12861-12874.
Zhang et al., *ACS Appl. Mater. Interfaces*, 7(13), 7251-7263 (2015).
Zhu et al., ACS Nano, 2014, 8, 2864-2872.

* cited by examiner

MULTIFUNCTIONAL AND STABLE NANO-ARCHITECTURES CONTAINING NANOCARBON AND NANO- OR MICRO STRUCTURES AND A CALCINED HYDROTALCITE SHELL

CROSS REFERENCE TO RELATED APPLICATIONS

This application is a national phase application under 35 U.S.C. § 371 of International Application No. PCT/IB2016/056760 filed Nov. 9, 2016, which claims the benefit of priority of U.S. Provisional Patent Application No. 62/253,837 filed Nov. 11, 2015, and U.S. Provisional Patent Application No. 62/418,498 filed Nov. 7, 2016. The entire contents of each of the above-referenced disclosures are specifically incorporated herein by reference without disclaimer.

BACKGROUND OF THE INVENTION

A. Field of the Invention

The invention generally concerns materials having a graphene-based shell structure or a core/graphene-based shell structure, methods of making the materials, and uses thereof. The materials can be made from the self-assembly of graphene-based structures having a surface coated with a curable organic material.

B. Description of Related Art

The petrochemical industry relies on conventional zeolite-based or zeolite-type catalysts for performing various conversion reactions including alkane dehydrogenation reaction at commercial scales. Such conventional catalysts face issues related to recyclability, coking and frequent regeneration, uncontrolled acidity, and sintering of metal species (if present). These issues have led to catalyst development focusing on sub-5 nm nanoparticles (e.g., Pt, Pd, and Au) or quantum dots. The sub-5 nm catalysts were utilized as highly active surfaces for facilitating a catalytic reaction, however, poor sinter-resistance and uncontrolled adsorption-desorption of the catalyst nanoparticles led to loss of catalyst activity, lower selectivity, conversion efficiencies, and enhanced coke formation.

Conventional hetero-structured nanocatalysts incorporate precious metals or transition metals into acidic/basic oxide/ceramic supports. Even though this approach can improve selectivity and conversion efficiencies of chemical reactions, these catalysts suffer from the inability to control the catalyst function and sintering over long periods of operating time. Thereafter, numerous reports on multi-component encapsulated nanocatalysts (core/shell, yolk/shell, nano-rattles, etc.) have been disclosed. Efforts in the multi-component encapsulated nanocatalysts suffer in the areas of material architecture, surface functionality, integration/stability/recycling, and manufacturing. Problems with material architecture include catalyst confinement, interaction with support, and a suitable/optimized electronic, chemical, and energy structure or environment. Towards this end, porous core/shell or core/multi-shell spherical or box configurations based on carbon and catalytic nanoparticles have been investigated (See, for example, Kim et al., *New Journal of Chemistry*, 2014, 38, 1606-1610; An et al., *ACS Applied Materials & Interfaces*, 2015, 7, 4969-4978; and Li et al., *Langmuir*, 2015, 31, 5164-5173). Fabrication of such hybrid systems can require a hard or soft template, catalytic nanoparticle loading and carbon encapsulation mechanism, and intelligent and programed synthesis steps to repeat and create multi-compartment configuration. However, these fabrications suffer from tedious multi-step coating and etching methods for making multi-shell and hollow configurations based on carbon or graphene (See, for example, Li et al., *Langmuir*, 2015, 31, 5164-5173; Zhang et al., *Scientific Reports*, 2014, 4, 4053). By way of example, the template choice can necessitate use of harsh acids, which can further damage and modify the carbon/graphene/graphene oxide (GO) shells. This can also lead to problems of catalytic nanoparticle dissolution in the etching solution (See, for example, Wu et al., *Journal of Physical Chemistry C*, 2012, 116, 12861-12874). In addition, most of the conventional techniques employ a carbonization process to convert carbon-based molecules or polymers into carbon shells. While these types of processes can enable adsorption or impregnation of metal nanoparticles, they can at the same time produce catalysts that lack the quality and properties of graphene-based materials (e.g., graphene or GO/reduced graphene oxide (rGO)), thereby limiting the carbonized shells to being a support. Other methods to make core/graphene-based shells include using electric plasma discharge. For example, Sergiienko et al., *Acta Materialia*, 2007, 55, 3671-3680 describes formation of a graphite-encapsulated cobalt nanoparticle synthesized by electric discharge in an ultrasonic cavitation field of liquid ethanol. In another example, Hong et al., *Journal of Physical Chemistry Letters*, 2010, 1, 3442-3445, discloses the synthesis of hollow-shell structures from positively charged and negatively charged functionalized reduced graphene oxides. However, this process suffers from 1) excessive aggregation due, in part, to the electrostatic attraction between the positively charged and negatively charged functional groups, 2) the complexity associated with creating a dispersion having a given pH with two oppositely charged dispersed objects, and 3) the inability to control the thickness of the graphene or graphene oxide layer.

Despite all of the currently available research on graphene-based shell structures or core/graphene-based shell structures, utilization of their unique properties has yet to be fully realized. This is due, in part, to the structural limitations currently seen with graphene-based structures. As discussed above, the currently available processes for producing such graphene-based structures can be complicated, time consuming, and/or expensive.

SUMMARY OF THE INVENTION

A discovery has been made that offers a solution to the current processes that are used to make materials having a graphene-based shell or a core/graphene-based shell design. In particular, the solution is premised on the ability to obtain a material having a multi-functional architecture in a minimal number of steps, while limiting or avoiding the use of harsh acid or base conditions. In one instance, the present invention employs the use of a process that relies on the self-assembly of graphene-based structures (e.g., graphene flakes or other derivatives of graphene) that can produce a graphene-based shell or a hybrid nano- or microstructure architecture design having a core/graphene-based shell setup. By way of example, a dispersion of graphene-based structures having at least a portion of their surfaces coated with a curable organic material (e.g., an epoxy resin) can self-assemble or fold to produce a graphene-based shell or fold around a nano- or microstructure to produce a core/ graphene-based shell. Without wishing to be bound by theory, it is believed that curing and optionally quenching the organic material aids in the self-folding mechanism of the graphene-based structures by inducing stresses leading to a curvature on the graphene surface, thereby aiding in the formation of a shell. Formation of the shell rather than an aggregated block of graphene structures is believed to be favored due to the curvature and/or in-situ electrostatic conditions between the graphene structures. Therefore, the use of functionalized graphene-based structures having positively charged and/or negatively charged groups can be avoided, if so desired. The resulting graphene-based shell material and/or core/graphene-based shell material of the present invention provide several advantages when compared with current materials such as those discussed above. For one, assembly of the graphene-based structures into a shell introduces accessible edges and strains within the carbon lattice of the shell that not only impart greater chemical activity, but also provides a suitable electronic environment for any encapsulated or coated nano- or microstructures. Even further, the graphene-based shell materials and/or core/graphene-based shell materials can be further modified by introducing an outer calcined hydrotalcite shell that encompasses the graphene-based shell. Still further, additional nano- or microstructures can be introduced into or deposited onto the graphene-based shell or the calcined hydrotalcite shell or both shell, thereby adding another level of architecture and functionality to the materials of the present invention. The resulting material can be designed or tuned for a variety of applications (e.g., catalyst for chemical reactions, a sensor, a filter, a controlled release media (e.g., fertilizer, personal care products (e.g., deodorants, soap, shampoos, detergents)), energy storage device (e.g., fuel cells, batteries, and supercapacitors), a plasmonic device or an optical device, etc.).

In one aspect of the present invention, a method for making a catalyst having a core/graphene-based shell structure is disclosed. The method provides parameter controls at each step, thereby allowing one to tune or modify the morphology, structure, and properties of the resulting catalyst. The method can include (a) obtaining a composition that includes core nano- or microstructures and graphene-based structures (e.g., graphene flakes) having at least a portion of a surface coated with a curable organic material, and (b) subjecting the composition to conditions that cure and optionally quench the composition to allow the graphene-based structures to self-assemble or fold around the core nano- or microstructures to produce a core/graphene-based shell structure that includes a graphene-based shell encompassing a core nano- or microstructure.

The coated graphene-based structures in step (a) can be pre-coated (e.g., one side or both sides, preferably one side) with the curable organic material and then dispersed into the composition. One of the issues with this pre-coating process is that it can require an additional coating step. In other instances, however, the coated graphene-based structures in step (a) can be obtained by (1) first dispersing uncoated graphene-based structures in the composition (e.g., an organic solvent such as benzyl alcohol) and then adding the curable organic material to the composition, (2) adding uncoated graphene-based structures to a composition that already includes the curable organic material, or (3) simultaneously adding uncoated graphene-based structures and the curable organic material to the composition, either of which can result in an in situ coating process that avoids the need for the aforementioned pre-coating step. Irrespective of whether a pre-coating process or an in-situ coating process is used, the organic material can coat at least a portion of the surfaces or the entire surface area of the graphene-based structures.

The curing conditions for step (b) can include heating the composition to a temperature of 15° C. to 400° C., preferably 100° C. to 150° C. for a period of time (e.g., 0.5 min. to 360 min). The organic material can be a curable polymer, oligomer, or monomer. In some embodiments, the organic material, once cured, produces a polymer film on a surface of the graphene-based structure that has a thickness of less than 100 nm, preferably 1 nm to 50 nm, or more preferably from 1 nm to 25 nm. Without wishing to be bound by theory, it is believed that curing and/or quenching of the organic material can induce stresses leading to curvature on the graphene surface. The curvature can be controlled by polymer thickness, curing temperature, curing duration, and/or quenching temperature. Quenching can include cooling the composition, which cools the cured or partially cured organic material, from the curing temperature of at least 100° C. to a temperature of 25° C. or less in a short amount of time (e.g., 1 min to 60 min). Solvents (e.g., benzyl alcohol or water) having a different isoelectric point of the nano- and microstructures present in the composition can serve to facilitate an electrostatic attraction between the folding coated graphene and the nano- and/or microstructures. This allows for an encapsulation process/formation of the shell around a nano or microstructure(s). It is also believed that similar charging on similar curvature of two graphene structures will repel each other while folding takes place. This can allow for maintaining uniform dispersion during the process, thereby inhibiting aggregation of structures and favoring formation of the shell. Additionally, and in certain aspects, the processes of the present invention do not require or utilize a mixture of functionalized graphene materials to achieve self-assembly (e.g., a first graphene-based structures having a functionalized positive group (e.g., rGO—$NH_3^+$) and a second graphene-based structures having a functionalized negative group (e.g., rGO—$COO^-$)). Rather, a single type of graphene-based structure (whether functionalized or not) can be used in combination with the curable polymeric coating to achieve self-assembly.

The method of the present invention can further include incorporating, in a step (c), second nano- or microstructures into graphene-based structures and/or on a surface of the produced graphene-based shell. In step (c) a second nano- or microstructure precursor can be added to the composition in either of steps (a) and/or (b) and second nano- or microstructures can be formed on a surface of the graphene-based structure and/or on a surface of the coated graphene-based shell. In some aspects, the second nano- or microstructure precursor solution can be added during step (a) and second nano- or microstructures are formed on the graphene-based structures prior to or during step (b). In another aspect, the second nano- or microstructure precursor solution is added during step (b) and second nano- or microstructures are formed on the graphene-based structures and/or on the graphene-based shell during step (b). In some embodiments, the second nano- or microstructures have been deposited on the graphene-based structures prior to step (a). The process of steps (a), (b) and/or (c) can be repeated to form a multi-shell core/graphene-based shell structure. For example, the produced core/graphene-based shell structure having second nano- or microstructures on the surface of the graphene-based shell can also be dispersed in a second composition that includes graphene-based structures coated with the curable organic material. Such a second composition can be subjected to conditions that cure the organic material and optionally quenching the composition to allow the graphene-based structures to self-assemble around the produced core/graphene-based shell structure to produce a core/graphene-based shell/nanoparticle/graphene-based shell structure. In embodiments when nano- or microstructures are not used as a core material, a graphene-based shell/nanoparticle/graphene-based shell structure is produced.

In steps (a), (b) and/or (c), a carbon species (e.g., a hydrocarbon, a sugar-based compound, a sulfonated carbon compound, nitrogen-based carbon compound, carbon-based monomer, aromatic compound, a metal-complexed carbon-based compound or any combination thereof) can be added to the composition to increase the porosity of the graphene-based shell.

In further instances, the method can include forming a second shell that encompasses the graphene-based shell structure(s) or core/graphene-based shell structure(s). The second shell can have a mesoporous or macroporous structure, with mesoporous being preferred. A thickness of the second shell can range from 0.5 nanometer (nm) to 1000 nm, preferably 10 nm to 100 nm, and most preferably from 1 nm to 50 nm. The second shell can include a metal oxide or mixed metal oxide. In instances where the second shell includes a metal oxide, a hydrotalcite material (e.g., MgAl-Ga(O)) is preferred. In some instances the metal oxide includes silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite shell comprising any combination thereof. The second shell can also include a dopant (e.g., one or more elements or metals from Columns 1 to 14 of the Periodic Table, preferably Columns 13 and 14, more preferably, gallium (Ga), indium (In), tin (Sn) or combinations thereof). Preparation of the second shell can include dispersing the core/graphene-based shell structure in a solution that includes metal salts (e.g., metal nitrates, metal hydroxides, metal chlorides, and the like) and heating the solution to form the second shell. Such a solution can be heated in at least two stages: (1) 50° C. to 150° C., preferably 60° C. for 30 minutes to 10 hours; and (2) 200° C. to 1000° C., preferably 700° C. for 2 hours to 10 hours to form a core/graphene-based shell/second shell structure. After forming the second shell, a third shell that includes graphene-based structures can be formed. Forming the third shell can include dispersing the core/graphene-based shell/second shell structure to a second composition that includes graphene-based structures coated with the curable organic material, and subjecting the second composition to conditions that cure the organic material and allow the graphene-based structures to self-assemble and form the third shell. The method can further include removing at least a portion or all of the core nano- or microstructure(s) with an etching agent.

In some instances where a pre-coating process is used to coat the graphene based structures, a first side of the graphene-based structures can be pre-coated with the curable organic material and a second opposing side is not coated with the curable organic material. In some instances, the curable polymer coating can have a thickness of less than 100 nm, preferably 1 nm to 50 nm, or more preferably from 1 nm to 25 nm. In some instances, the curable organic material is a thermoset material (e.g., an epoxy resin, an alkyd resin, an amino-based material, a phenolic material, a polyester material, a polyimide material, a silicon material or combinations thereof). The coating can be made from a composition having a thermoplastic material and can also include other non-thermoplastic materials, additives, and the like, that can be added to the composition. Thermoset matrices are cured or become cross-linked and tend to lose the ability to become pliable or moldable at raised temperatures.

The core or yolk nano- or microstructures of the core/graphene-based shell structures described herein can include metal or a metal oxide, preferably a metal oxide (e.g., silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite particle comprising any combination thereof).

The core/graphene-based shell structure made using the methods described above can include a single core nano- or microstructure or a plurality of core nano- or microstructures. A diameter of the core nano- or microstructure(s) can range from of 1 nm to 5000 nm, 1 nm to 1000 nm, preferably 1 nm to 50 nm, or more preferably 1 nm to 5 nm. The core nano- or microstructure(s) can fill 1% to 99%, preferably 30% to 60%, of the volume of the void space of the graphene-based shell, where the void space is defined as a void formed from the inner surface of the graphene-based shell. Any of the graphene-based shell can have a mesoporous or macroporous structure, preferably a mesoporous structure. The porosity of any one of the disclosed graphene-based shells can range of 20% to 90%, preferably from 40% to 70%. A thickness of any one of the disclosed graphene-based shell can range from 0.5 nanometer (nm) to 1000 nm, preferably 10 nm to 100 nm, and most preferably from 1 nm to 50 nm.

In some embodiments, a material having a multilevel core-shell structure is disclosed. In some embodiments, the material has catalytic properties. The material can have a graphene-based shell having a void space defined by the inner surface of the graphene-based shell, where nano- or microstructures (e.g., catalytic metals) are dispersed on the outer, inner or both surfaces of the graphene-based shell; and a calcined hydrotalcite shell that encompasses the graphene-based shell and dispersed nano- or microstructures. The inner surface of the graphene-based shell can have a cured polymeric coating having a thickness of less than 100 nm, preferably 1 nm to 50 nm, or more preferably from 1 nm to 25 nm. The graphene-based shell can include graphene, graphene oxide, reduced graphene oxide, graphite oxide, graphene quantum dots, or other derivatives of graphene. In some instances, the graphene-based shell is the reaction product of graphene-based structures having at least a portion of a surface coated with a curable organic material, heat, quenching, and a core particle(s). In other embodiments, the graphene-based shell can include a carbon species (e.g., a hydrocarbon, a sugar-based compound, a sulfonated carbon compound, nitrogen-based carbon compound, carbon-based monomer, aromatic compound, a metal-complexed carbon-based compound or any combination thereof) other than graphene. The nano- or microstructures can be a noble metal (e.g., palladium (Pd), platinum (Pt), gold (Au), rhodium (Rh), ruthenium (Ru), rhenium (Re), osmium (Os), iridium (Ir), or any combinations or alloys thereof) or a transition metal (e.g., copper (Cu), iron (Fe), nickel (Ni), zinc (Zn), manganese (Mn), chromium (Cr), molybdenum (Mo), tungsten (W), tin (Sn), silver (Ag), or any combinations or alloys thereof) that are dispersed on the outer, inner, or both surfaces of the graphene-based shell have an average particle size of 1 to 50 nm, preferably 1 to 25 nm, or more preferably from 1 to 10 nm. In some instances, the graphene-based shell and the calcined hydrotalcite shell each individually have a mesoporous or macroporous structure, preferably a mesoporous structure. The graphene-based shell and the calcined hydrotalcite shell can each individually have a thickness of 0.5 nanometer (nm) to 1000 nm, preferably 10 nm to 100 nm, and most preferably from 1 nm to 50 nm and/or each individually can have a porosity of 20% to 90%, preferably from 40% to 70%. The void space of the graphene-based shell can include a metal core nano- or microstructure or a metal oxide core nano- or microstructure (e.g., silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite comprising any combination thereof). Such a core can fill 1% to 99%, preferably 30% to 60%, of the volume of the void space of the graphene-based shell. The core can include a single core nano- or microstructure or a plurality of nano- or microstructures. In some instance, each of the structures have a diameter of 1 nm to 5000 nm, 1 nm to 1000 nm, preferably 1 nm to 50 nm, or more preferably 1 nm to 5 nm.

The graphene-based shell material(s) of the present invention can further include multiple graphene-based shells and/or calcined hydrotalcite shells. Each of the graphene-based shells can include metal nano- or microstructures dispersed on the outer, inner, or both surfaces of the second graphene-based shell. At least one of the graphene-based shells (e.g., a second graphene-based shell) can be positioned between the graphene-based shell and the calcined hydrotalcite shell. Another third graphene-based shell (e.g., a third graphene-based shell) can encompass the calcined hydrotalcite shell. The number of graphed-based shell and calcined hydrotalcite shells can be tuned to fit the nature and/or conditions of the chemical reaction. Each of the calcined hydrotalcite shells can include a dopant (e.g., an element or metal from Columns 1 to 14 of the Periodic Table, preferably Columns 13 or 14, preferably gallium (Ga), indium (In), tin (Sn), or combinations thereof).

In some embodiments, a multilevel core-shell structured catalyst or a catalyst made by any one of the methods described herein can be contacted with a reactant feed to catalyze a chemical reaction and produce a product feed. Non-limiting examples of a chemical reaction include a hydrocarbon cracking reaction, a hydrogenation of hydrocarbon reaction, a dehydrogenation of hydrocarbon reaction, denitrogenation reaction, desulfurization reaction, hydrocarbon aromatization reaction environmental remediation reaction, 3-way automobile catalytic convertor reaction, or any combination thereof, or the like.

In yet another instance, a system for producing a chemical product can include (a) an inlet for a reactant feed; a reaction zone (e.g., continuous flow reactor selected from a fixed-bed reactor, a fluidized reactor, or a moving bed reactor) that is configured to be in fluid communication with the inlet; and (c) an outlet configured to be in fluid communication with the reaction zone and configured to remove a product stream from the reaction zone. The reaction zone can include the multilevel core-shell structured catalyst or a catalyst made by any one of the methods described herein.

In some embodiments, the multilevel core-shell structured graphene-based materials or the multilevel core-shell structured graphene-based materials made by any one of the methods described herein can be used in an article of manufacture (e.g., sensors, biosensors, electrodes, optical/plasmonic device, filters, controlled release media such as in fertilizers and personal care products, energy storage devices (e.g., fuel cells, batteries, and supercapacitors), and the like) or used to make the article of manufacture.

In the context of the present invention, 74 catalyst embodiments are described. Embodiment 1 is a method for making a catalyst having a core/graphene-based shell structure, the method can include: (a) obtaining a composition comprising core nano- or microstructures and graphene-based structures having a surface coated with a curable polymer film, wherein the core nano- or microstructures and graphene-based structures are dispersed throughout the composition; and (b) subjecting the composition to conditions that cure the polymer film and allow the graphene-based structures to self-assemble around the core nano- or microstructures to produce a core/graphene-based shell structure comprising a graphene-based shell encompassing a core nano- or microstructure. Embodiment 2 is the method of embodiment 1, wherein the conditions that cure the polymer film include heating the composition to a temperature of 15° C. to 400° C. for 0.5 min. to 180 min. Embodiment 3 is the method of embodiment 2, wherein the composition is an aqueous solution having a pH of 2 to 13, preferably 5 to 9, more preferably 6 to 8, or most preferably 6.5 to 7.5. Embodiment 4 is he method of any one of embodiments 1 to 3, wherein the core nano- or microstructure comprises a metal, a metal oxide, a metal alloy, a bimetallic metal, a trimetallic metal, a nitride compound, a chalcogenide, a quantum dot, or combinations thereof. Embodiment 5 is the method of any one of embodiments 1 to 4, further comprising: (c) adding a nano- or microstructure precursor solution to the composition in either of steps (a) and/or (b) and forming second nano- or microstructures on a surface of the graphene-based structures and/or on a surface of the graphene-based shell that is coated with the curable polymer film. Embodiment 6 is the method of embodiment 5, wherein the nano- or microstructure precursor solution is added during step (a) and second nano- or microstructures are formed on the graphene-based structures prior to or during step (b). Embodiment 7 is the method of embodiment 5, wherein the nano- or microstructure precursor solution is added during step (b) and second nano- or microstructures are formed on the graphene-based structures and/or on the graphene-based shell during step (b). Embodiment 8 is the method of any one of embodiments 1 to 4, wherein second nano- or microstructures have been deposited on the graphene-based structures prior to step (a). Embodiment 9 is the method of any one of embodiments 5 to 8, wherein the second nano- or microstructures comprise a noble metal selected from the group consisting of silver (Ag), palladium (Pd), platinum (Pt), gold (Au), rhodium (Rh), ruthenium (Ru), rhenium (Re), or iridium (Ir), or any combinations or alloys thereof. Embodiment 10 is the method of any one of embodiments 4 to 9, wherein the nano- or microstructures comprise a transition metal selected from the group consisting of copper (Cu), iron (Fe), nickel (Ni), zinc (Zn), manganese (Mn), chromium (Cr), molybdenum (Mo), tungsten (W), osmium (Os), or tin (Sn), or any combinations or alloys thereof. Embodiment 11 is the method of any one of embodiments 5 to 10, wherein the produced core/graphene-based shell structure having second nano- or microstructures on the surface of the graphene-based shell is dispersed in a second composition comprising graphene-based structures coated with the curable polymer film, and wherein the second composition is subjected to conditions that cure the polymer film and allow the graphene-based structures to self-assemble around the produced core/graphene-based shell structure to produce a core/graphene-based shell/nanoparticle/graphene-based shell structure. Embodiments 12 is the method of any one of embodiments 1 to 11, wherein a carbon species is added to the composition in step (a) and/or step (b) to increase the porosity of the graphene-based shell. Embodiment 13 is the method of embodiment 12, wherein the carbon species is a hydrocarbon, a sugar-based compound, a sulfonated carbon compound, nitrogen-based carbon compound, carbon-based monomer, aromatic compound, a metal-complexed carbon-based compound or any combination thereof. Embodiment 14 is the method of any one of embodiments 1 to 13, further comprising: (d) forming a second shell that encompasses the core/graphene-based shell structure. Embodiment 15 is the method of embodiment 13, wherein the second shell is a metal oxide or mixed metal oxide shell. Embodiment 16 is the method of embodiment 14, wherein the shell is a mixed metal oxide shell, preferably a hydrotalcite shell. Embodiment 17 is the method of embodiment 14, wherein the shell is a metal oxide shell selected from silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite shell comprising any combination thereof. Embodiment 18 is the method of any one of embodiments 14 to 17, wherein the shell comprises a dopant. Embodiment 19 is the method of embodiment 18, wherein the dopant is selected from Columns 1 to 14 of the Periodic Table, preferably Columns 13 and 14, more preferably, gallium (Ga), indium (In), tin (Sn) or combinations thereof. Embodiment 20 is the method of any one of embodiments 14 to 19, comprising dispersing the core/graphene-based shell structure in a solution comprising metal nitrates and heating the solution to form the second shell. Embodiment 21 is the method of embodiment 20, wherein the solution is heated in at least two stages: (1) 50° C. to 150° C. for 30 minutes to 10 hours; and (2) 200° C. to 1000° C. for 2 hours to 10 hours. Embodiment 22 is the method of any one of embodiments 14 to 21, wherein the second shell has a mesoporous or macroporous structure, preferably a mesoporous structure. Embodiment 23 is the method of any one of embodiments 14 to 22, wherein the second shell has a thickness of 0.5 nanometer (nm) to 1000 nm, preferably 10 nm to 100 nm, and most preferably from 1 nm to 50 nm. Embodiment 24 is the method of any one of embodiments 14 to 23, further comprising forming a third shell that encompasses the second shell, wherein the third shell is a graphene-based shell formed by dispersing the core/graphene-based shell/second shell structure and/or the core/graphene-based shell/nano- or microstructures/second shell structure in a second composition comprising graphene-based structures coated with the curable polymer film, and wherein the second composition is subjected to conditions that cure the polymer film and allow the graphene-based structures to self-assemble and form the third shell. Embodiment 25 is the method of embodiment 24, further comprising dispersing the dispersing the core/graphene-based shell/second shell structure and/or the core/graphene-based shell/nano- or microstructures/second shell structure in a third nano- or microstructure precursor solution and forming second nano- or microstructures on a surface of the graphene-based third shell. Embodiment 26 is the method of any one of embodiments 1 to 25, wherein a first side of the graphene-based flakes are coated with the curable polymer film and a second opposing side is not coated with the curable polymer film. Embodiment 27 is the method of any one of embodiments 1 to 26, wherein the graphene-based structures comprise graphene, graphene oxide, reduced graphene oxide, graphite oxide, or graphene quantum dots. Embodiment 28 is the method of any one of embodiments 1 to 27, wherein the curable polymer film has a thickness of less than 100 nm, preferably 1 nm to 50 nm, or more preferably from 1 nm to 25 nm. Embodiment 29 is the method of any one of embodiments 1 to 28, wherein the curable polymer film is a thermoset polymer film. Embodiment 30 is the method of embodiment 29, wherein the thermoset polymer film is an epoxy film, an alkyd film, an amino-based film, a phenolic film, a polyester film, a polyimide film, a silicon film or combinations thereof. Embodiment 31 is the method of any one of embodiments 1 to 30, wherein the core nano- or microstructures comprise a metal or a metal oxide, preferably a metal oxide. Embodiment 32 is the method of embodiment 31, wherein the metal oxide is silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite particle comprising any combination thereof. Embodiment 33 is the method of any one of embodiments 1 to 31, wherein the core/graphene-based shell structure comprises a single core nano- or microstructure. Embodiment 34 is the method of any one of embodiments 1 to 33, wherein the core/graphene-based shell structure comprises a plurality of core nano- or microstructures. Embodiment 35 is the method of any one of embodiments 1 to 34, wherein the core nano- or microstructure(s) each have a diameter of 1 nm to 1000 nm, preferably 1 nm to 50 nm, or more preferably 1 nm to 5 nm. Embodiment 36 is the method of any one of embodiments 1 to 35, wherein the core nano- or microstructure(s) fill 1% to 99%, preferably 30% to 60%, of the volume of the void space of the graphene-based shell, wherein the void space is defined as a void formed from the inner surface of the graphene-based shell. Embodiment 37 is the method of any one of embodiments 1 to 36, wherein any one of the graphene-based shells has a mesoporous or macroporous structure, preferably a mesoporous structure. Embodiment 38 is the method of any one of embodiments 1 to 37, wherein the graphene-based shell has a thickness of 0.5 nanometer (nm) to 1000 nm, preferably 10 nm to 100 nm, and most preferably from 1 nm to 50 nm. Embodiment 39 is the method of any one of embodiments 1 to 38, wherein the graphene-based shell has a porosity of 20% to 90%, preferably from 40% to 70%. Embodiment 40 is the method of any one of embodiments 1 to 39, further comprising removing at least a portion or all of the core nano- or microstructure(s) with an etching agent. Embodiment 41 is a catalyst having a core/graphene-based shell structure made by the method of any one of embodiments 1 to 40 or other methods described throughout the Specification. Embodiment 42 is the catalyst of embodiment 41, wherein the catalyst is capable of catalyzing a chemical reaction. Embodiment 43 is the catalyst of embodiment 42, wherein the chemical reaction is a hydrocarbon cracking reaction, a hydrogenation of hydrocarbon reaction, a dehydrogenation of hydrocarbon reaction, denitrogenation reaction, desulfurization reaction, hydrocarbon aromatization reaction, 3-way catalytic convertor reaction, environmental remediation reaction, or any combination thereof.

Embodiment 44 is a catalyst having a multilevel core-shell structure comprising: a graphene-based shell having a void space defined by the inner surface of the graphene-based shell, wherein catalytic nano- or microstructures are dispersed on the outer, inner or both surfaces of the graphene-based shell, and a calcined hydrotalcite shell that encompasses the graphene-based shell and dispersed catalytic nanostructures. Embodiment 45 is the catalyst of embodiment 44, wherein the inner surface of the catalytic shell comprises a cured polymeric film. Embodiment 46 is the catalyst of embodiment 45, wherein the cured polymeric film has a thickness of less than 100 nm, preferably 1 nm to 50 nm, or more preferably from 1 nm to 25 nm. Embodiment 47 is the catalyst of any one of embodiments 44 to 46, wherein the graphene-based shell comprises graphene, graphene oxide, reduced graphene oxide, graphite oxide, or graphene quantum dots. Embodiment 48 is the catalyst of any one of embodiments 44 to 47, wherein the graphene-based shell is the reaction product of graphene-based structures having a surface coated with a curable polymer film, heat, and a core particle(s). Embodiment 49 is the catalyst of any one of embodiments 44 to 48, wherein the catalytic nano- or microstructures that are dispersed on the outer, inner, or both surfaces of the graphene-based shell have an average particle size of 1 to 50 nm, preferably 1 to 25 nm, or more preferably from 1 to 10 nm. Embodiment 50 is the catalyst of any one of embodiments 44 to 49, wherein the catalytic nano- or microstructures comprise a noble metal selected from the group consisting of palladium (Pd), platinum (Pt), gold (Au), rhodium (Rh), ruthenium (Ru), rhenium (Re), iridium (Ir), osmium (Os), or any combinations or alloys thereof. Embodiment 51 is the catalyst of any one of embodiments 44 to 50, wherein the catalytic nano- or microstructures comprise a transition metal selected from the group consisting of copper (Cu), iron (Fe), nickel (Ni), zinc (Zn), manganese (Mn), chromium (Cr), molybdenum (Mo), tungsten (W), tin (Sn), silver (Ag), or any combinations or alloys thereof. Embodiment 52 is the catalyst of any one of embodiments 44 to 51, wherein a carbon species other than graphene is comprised in the graphene-based shell. Embodiment 53 is the catalyst of embodiment 52, wherein the carbon species is a hydrocarbon, a sugar-based compound, a sulfonated carbon compound, nitrogen-based carbon compound, carbon-based monomer, aromatic compound, a metal-complexed carbon-based compound or any combination thereof. Embodiment 54 is the catalyst of any one of embodiments 44 to 53, wherein the graphene-based shell and the calcined hydrotalcite shell each individually have a mesoporous or macroporous structure, preferably a mesoporous structure. Embodiment 55 is the catalyst of any one of embodiments 44 to 54, wherein the graphene-based shell and the calcined hydrotalcite shell each individually have a thickness of 0.5 nanometer (nm) to 1000 nm, preferably 10 nm to 100 nm, and most preferably from 1 nm to 50 nm. Embodiment 56 is the catalyst of any one of embodiments 44 to 55, wherein the graphene-based shell and the calcined hydrotalcite shell each individually have a porosity of 20% to 90%, preferably from 40% to 70%. Embodiment 56 is the catalyst of any one of embodiments 44 to 56, wherein the void space of the graphene-based shell has a metal core nano- or microstructure or a metal oxide nano- or microstructure. Embodiment 57 is the catalyst of embodiment 57, wherein the metal oxide core comprises silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite comprising any combination thereof. Embodiment 59 is the catalyst of any one of embodiments 57 to 58, wherein the core comprises a single core nano- or microstructure. Embodiment 60 is the catalyst of any one of embodiments 57 to 58, wherein the core comprises a plurality of core nano- or microstructures. Embodiment 61 is the catalyst of any one of embodiments 57 to 60, wherein the core nano- or microstructure(s) each have a diameter of 1 nm to 5000 nm, 1 nm to 1000 nm, preferably 1 nm to 50 nm, or more preferably 1 nm to 5 nm. Embodiment 62 is the catalyst of any one of embodiments 57 to 61, wherein the core nano- or microstructure(s) fill 1% to 99%, preferably 30% to 60%, of the volume of the void space of the graphene-based shell. Embodiment 63 is the catalyst of any one of embodiments 44 to 62, further comprising at least a second graphene-based shell that is positioned between the graphene-based shell and the calcined hydrotalcite shell. Embodiment 64 is the catalyst of embodiment 63, wherein the second graphene-based shell comprises catalytic metal nano- or microstructures dispersed on the outer, inner, or both surfaces of the second graphene-based shell. Embodiment 65 is the catalyst of any one of embodiments 63 to 64, further comprising at least a third graphene-based shell that encompasses the calcined hydrotalcite shell. Embodiment 66 is the catalyst of embodiment 65, wherein the third graphene-based shell comprises catalytic metal nano- or microstructures dispersed on the outer, inner, or both surfaces of the third graphene-based shell. Embodiment 67 is the catalyst of any one of embodiments 44 to 66, further comprising at least a second graphene shell that encompasses the calcined hydrotalcite shell. Embodiment 68 is the catalyst of embodiment 67, wherein the second graphene-based shell comprises catalytic metal nano- or microstructures dispersed on the inner, outer, or both surfaces of the second graphene-based shell. Embodiment 69 is the catalyst of any one of embodiments 44 to 68, wherein the calcined hydrotalcite shell comprises one or more dopants. Embodiment 70 is the catalyst of embodiment 69, wherein the dopant is selected from Columns 1 to 14 of the Periodic Table, preferably Columns 13 or 14, preferably gallium (Ga), indium (In), tin (Sn), or combinations thereof. Embodiment 71 is a method for using the catalyst of any one of embodiments 41 to 70 in a chemical reaction, the method comprising contacting the catalyst with a reactant feed to catalyze the reaction and produce a product feed. Embodiment 72 is the method of embodiment 71, wherein the chemical reaction comprises a hydrocarbon cracking reaction, a hydrogenation of hydrocarbon reaction, a dehydrogenation of hydrocarbon reaction, a denitrogenation reaction, a desulfurization reaction, a hydrocarbon aromatization reaction, 3-way catalytic convertor reaction, environmental remediation reaction, or any combination thereof. Embodiment 73 is a system for producing a chemical product, the system can include: (a) an inlet for a reactant feed; (b) a reaction zone that is configured to be in fluid communication with the inlet, wherein the reaction zone comprises the catalyst of any one of embodiments 41 to 70; and (c) an outlet configured to be in fluid communication with the reaction zone and configured to remove a product stream from the reaction zone. Embodiment 74 is the system of embodiment 73, wherein the reaction zone is a continuous flow reactor selected from a fixed-bed reactor, a fluidized reactor, or a moving bed reactor.

The following includes definitions of various terms and phrases used throughout this specification.

The "core/graphene-based shell" phrase encompasses both core/shell and yolk/shell structures, with the difference being that in a core/shell structure at least 50% of the surface of the "core" contacts the shell. By comparison, a yolk/shell structure includes instances where less than 50% of the surface of the "yolk" contacts the shell.

Determination of whether a core, yolk, or void space is present in the core/graphene based shell structures or materials of the present invention can be made by persons of ordinary skill in the art. One example is visual inspection of a transition electron microscope (TEM) or a scanning transmission electron microscope (STEM) image of a core/ graphene based shell structure or material of the present invention and determining whether a void space is present or determining whether at least 50% (core) or less (yolk) of the surface of a given nanostructure (preferably a nanoparticle) contacts the graphene-based shell.

The terms "graphene-based structures" refers to a collection of 2D materials that include multi-layered materials, chemically modified materials, and materials using graphene, graphene oxide, or another graphene material as a precursor as described in "All in the graphene family—A recommended nomenclature for two-dimensional carbon materials", *Carbon,* 2013, 65, 1-6, which is incorporated herein by reference. Non-limiting examples of such materials are graphene, a graphene layer, a bilayer graphene, a trilayer graphene, a multi-layer graphene, a few-layer graphene, a graphene quantum dot, a graphene oxide, a reduced graphene oxide, or the like. The graphene-based structures can have a flake or film or flattened morphology.

The terms "self-assembly" or "self-folding" each refer to the ability of the graphene-based structures having the curable organic material to adopt a defined arrangement during curing of the film so as to be able to form a shell when combined together. FIG. 1, element 104, provides a non-limiting illustration of a graphene structure that self-folds upon curing of the film to form a curved morphology having a convex side and a concave side. When a plurality of the self-assembled structures combine together, a shell can be formed. FIGS. 6B-F are SEM images of the self-assembled graphene-based materials of the present invention.

"Nanostructure" refers to an object or material in which at least one dimension of the object or material is equal to or less than 1000 nm (e.g., one dimension is 1 to 1000 nm in size). In a particular aspect, the nanostructure includes at least two dimensions that are equal to or less than 1000 nm (e.g., a first dimension is 1 to 1000 nm in size and a second dimension is 1 to 1000 nm in size). In another aspect, the nanostructure includes three dimensions that are equal to or less than 1000 nm (e.g., a first dimension is 1 to 1000 nm in size, a second dimension is 1 to 1000 nm in size, and a third dimension is 1 to 1000 nm in size). The shape of the nanostructure can be of a wire, a particle (e.g., having a substantially spherical shape), a rod, a tetrapod, a hyper-branched structure, a tube, a cube, or mixtures thereof. "Nanoparticles" include particles having an average diameter size of 1 to 1000 nanometers.

"Microstructure" refers to an object or material in which at least one dimension of the object or material is greater than 1000 nm (e.g., greater than 1000 nm up to 5000 nm) and in which no dimension of the structure is 1000 nm or smaller. The shape of the microstructure can be of a wire, a particle, a sphere, a rod, a tetrapod, a hyper-branched structure, a tube, a cube, or mixtures thereof. "Microparticles" include particles having an average diameter size of greater than 1000 nm, preferably greater than 1000 nm to 5000 nm, or more preferably greater than 1000 nm to 10000 nm.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined to include the ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising", "including", "containing", or "having" in the claims, or the specification, may mean "one," but it is also consistent with the meaning of "one or more", "at least one", and "one or more than one."

The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The catalysts, graphene-based shell structures, core/graphene-based shell structures and methods of making said structures of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the material and methods of the present invention are the ability of the graphene-based structures to self-assemble to produce a graphene-based shell or self-assemble around a core nano- or microstructure to produce a core/graphene-based shell structure having a graphene-based shell encompassing a core nano- or microstructure.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1A:
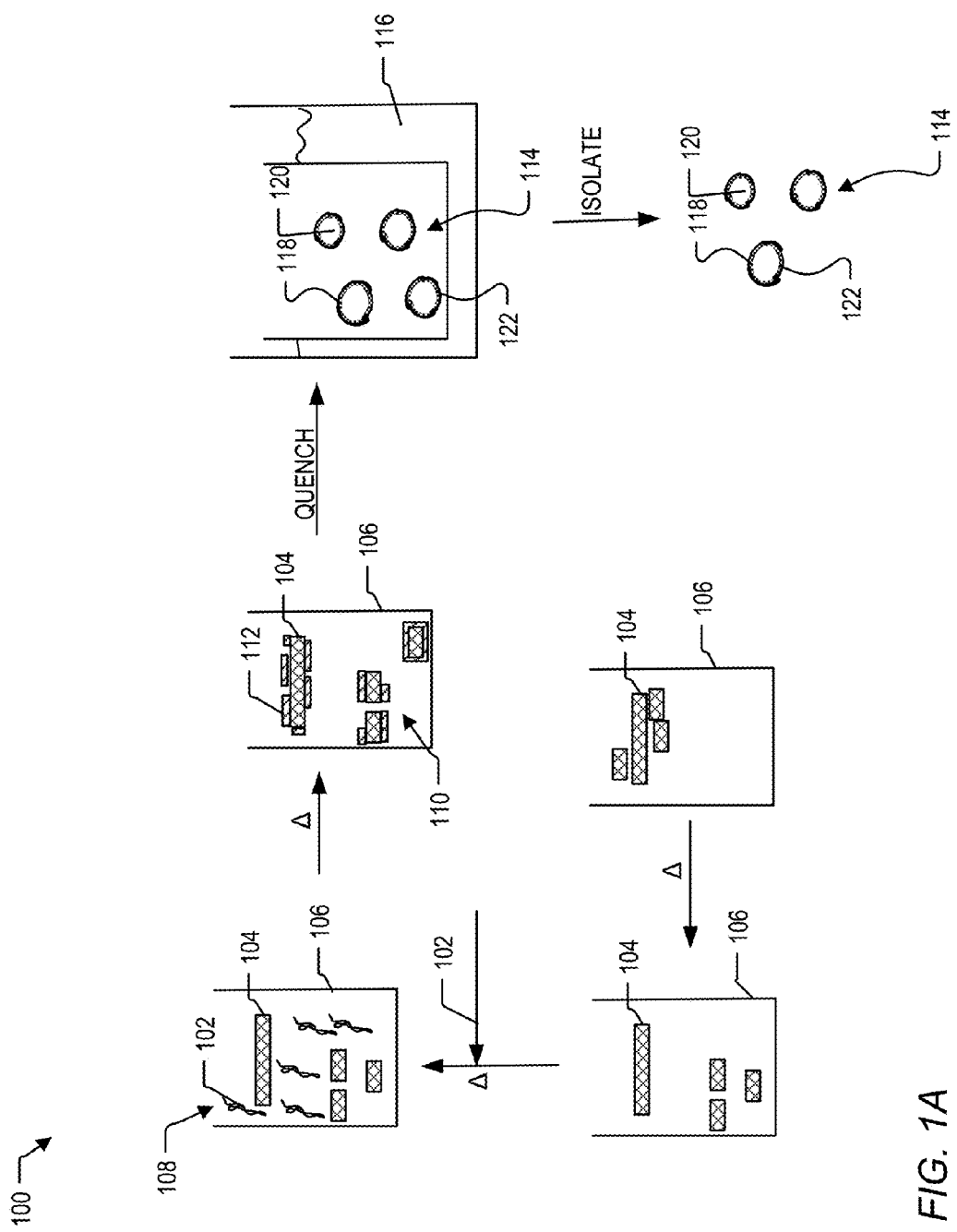
FIG. 1A is a schematic of an embodiment of an in situ method for preparing a material of the present invention having a graphene-based shell structure.

While the invention is susceptible to various modifications and alternative forms, specific embodiments thereof are shown by way of example in the drawings and may herein be described in detail. The drawings may not be to scale.

DETAILED DESCRIPTION OF THE INVENTION

A solution that overcomes the problems of conventional methods of making graphene-based shell structures and/or core/graphene-based shell structures has been discovered. The solution is premised on a new multifunctional porous nano-architecture where highly-active graphene-based surface/edges are combined together under mild conditions. In some embodiments, the solution is premised on a new multifunctional porous nano-architecture material where a support, an active metal, and highly-active graphene-based surface/edges are combined together. In some embodiments, the multifunctional porous nano-architecture material is used as a catalyst or in an energy storage application. By way of example, the core nano- or microstructures can act as a support, the graphene-based structures (e.g., flakes) that form the graphene shell can function as re-adsorption sites and/or as chemically reactive sites, and the calcined hydrotalcite-type shell (e.g., MgAlGa(O)) can act as an enhancer (e.g., catalytic enhancer). The hydrotalcite-type shell can be doped with metals (e.g., tin (Sn), gallium (Ga), indium (In), or the like). Still further, the calcined hydrotalcite-type shell can further act to protect any nano- or micro-structures that are dispersed on the graphene-based shell, thereby preventing or reducing the likelihood of sintering, aggregation, and/or agglomeration of the dispersed nano- or microstructures.

Notably, the methods used to make the materials of the present invention are relatively simplified and rely on the self-assembly or folding of graphene-based structures that have at least a portion of a surface coated with a curable organic material, or coated in the presence of core nano- or microstructures. This self-assembly or folding process can be performed in a liquid phase, thereby allowing for (1) scalability of the process and (2) the use of a broad range of materials and tunability of the produced materials. Without wishing to be bound by theory, it is believed that the materials of the present invention will have a porosity that can impart faster diffusion kinetics as compared to the more typical flat substrate geometry typically associated with 2D nanomaterials such as graphene.

These and other non-limiting aspects of the present invention are discussed in further detail in the following sections with reference to the Figures.

A. Preparation of Graphene-Based Shell Structures

FIGS. 1A, 1B, and 2A-2D are schematics of methods of preparing materials having a graphene-based shell structure or a core/graphene-based shell structure. The methods can include one or more steps that can be used in combination to make a multi-structured material. FIGS. 3A and 3B depict illustrations of the multi-structured materials.

1. Preparation of Composition of Graphene-Based Structures In Situ (One Pot) Coating Referring to FIG. 1A, method 100 can include obtaining a composition that includes a solvent (e.g., an organic solvent or water) and graphene-based structures (e.g., graphene-based flakes) having at least a portion of its surface coated with a curable organic material (e.g., monomeric or polymeric material) and subjecting the composition to conditions to cure the organic material and conditions to allow self-assembly or folding the graphene-based structures, thereby forming a graphene-based shell. While graphene-based structures are described, it should be understood that this method could be used on other 2D materials to produce coated 2D materials. The surfaces of the graphene-based structures can be fully coated, partially coated, or a combination thereof. Curable organic material 102 (e.g., cross-linkable monomers or polymers) and graphene-based structures 104 can be combined with a solvent (e.g., benzyl alcohol, not shown) in reaction unit 106 to form composition 108. Composition 108 can include optional curing agents (e.g., crosslinking agents and/or activators) in addition to the polymeric or monomeric material. In some embodiments, curable organic material 102 includes a mixture of monomeric epoxy resin and curing agents in a weight ratio 3:1 to 6:1, or 3.5:1 to 5.5:1, 4:1 to 5:1, or about 4:1 of resin to curing agents. Composition 108 can be heated to 50 to 150° C., 110 to 140° C., 120 to 130° C., or about 120° C. In some embodiments, graphene-based structures 104 can be dispersed in the solvent, and heated to 100 to 150° C., 110 to 140° C., 120 to 150° C., or about 120° C. prior to adding curable organic material 102. Heating the graphene-based structures can inhibit the graphene-based structures from agglomerating in solution and help exfoliation of the graphene-based structures. After heating, a solution of curable organic material 102 in the solvent and crosslinking agents and/or activator can be added to the hot solution. During heating of the graphene-based structures/curable organic material composition 108, curable organic material 102 can adhere (coat) to graphene-based structures 104, and then undergo in situ curing to form coated graphene-based structures 110 that include coating 112 and graphene-based structure 104. Composition 108 can be heated at the desired temperature (e.g., 50 to 150° C.), subjected to light (e.g., ultraviolet irradiation) or electromagnetic force for a time sufficient to cure at least 5%, at least 10%, at least 50%, at least 60%, at least 80% or at least 90% of the curable organic material. Such a time period can be from 1 minute (min.) to 12 hours (h), 10 min. to 8 hours, 30 min to 6 hours, or any range or value there between (e.g., 2 min, 5 min, 10 min, 15 min., 20 min, 25 min., 30 min., 35 min., 40 min, 45 min., 50 min, 55 min., 60 min., 1.5 h, 2 h, 2.5 h, 3 h., 3.5 h., 4 h., 4.5 h., 5 h., 5.5 h., 6 h., 6.5 h., 7 h., 7.5 h., 8 h., 8.5 h., 9 h., 9.5 h., 10 h., 10.5 h., 11 h., 11.5 h.). In some embodiments, the solution or composition can be heated to a temperature of 15° C. to 400° C., 20° C. to 300° C., 25° C. to 200° C., 30° C. to 100° C., 40° C. to 90° C., 50° C. to 80° C., 60° C. to 70° C. or any range or temperature there between for a time suitable to cure the organic material (e.g., 0.5 min to 300 min, or 10 min to 180 min, etc.). After curing, coated graphene-based structures 110 can be quenched under conditions sufficient to allow the coated graphene-based structures to self-assemble to form hollow graphene-based structures 114. Quenching conditions can include reducing the temperature of coated graphene-based structures 110 or the solution containing the coated graphene-based structures to less than 30° C., less than 25° C., less than 20° C., less than 10° C., less than 5° C., less than 0° C. or less than −10° C. or any range or value there between. The reduction of temperature can be at a rate of 10° C. per min or more, 20° C. per min or more, 50° C. per min or more. Quenching can also be performed by plunging the reaction vessel 106 into vessel or bath 116 at a temperature of −50° C. to −80° C. (e.g., a dry ice-acetone bath). The temperature reduction is sufficient to induce stresses leading to positive curvature on the graphene-based structure surface, thereby forming a concave portion and a convex portion, the concave portion forming the inner portion of the shell and the convex portion forming the outer surface of the shell. Hollow graphene-based structures 114 can include shell 118, hollow portion 120, and polymer coating 122. Polymer coating 122 can be on the inside surface and/or the outside surface of the structure. The coating can be a full coating or a partial coating on each surface of the shell. (See, for example, FIG. 9)

Hollow graphene-based structures 114 can be isolated (e.g., filtration, centrifugation, and the like), washed to remove any residual solvent, unreacted curable organic material and/or other components (e.g., crosslinking or activating agents), and dried at a temperature sufficient to remove any residual components. A non-limiting example, of a drying temperature is 20° C. to 100° C., or 25° C. to 80° C., or 30° C. to 70° C. or any range or value there between. In some embodiments, the polymer coating can be partially or fully removed through heating of the graphene-based shell structure.

The graphene-based shells of the present invention can have a porosity of 20% to 90%, preferably from 40% to 70%, or 20%, 30%, 40%, 50%, 60%, 70%, 80%, 90%, or any range or value there between. Further, the thickness of the graphene-based shells can be modified or tuned as desired by limiting the amount of the coating or by increasing the amount and/or size of the graphene-based structures (e.g., multi-layered graphene). By way of example, the thickness of the network can be 0.5 nm to 1000 nm, 10 nm to 100 nm, 10 nm to 50 nm, or 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26 nm, 27 nm, 28 nm, 29 nm, 30 nm, 31 nm, 32 nm, 33 nm, 34 nm, 35 nm, 36 nm, 37 nm, 38 nm, 39 nm, 40 nm, 41 nm, 42 nm, 43 nm, 44 nm, 45 nm, 46 nm, 47 nm, 48 nm, 49 nm, 50 nm, or any range or value there between.

2. Preparation of Composition of Graphene-Based Structures Film (2 Pot) Process

Figure 1B:
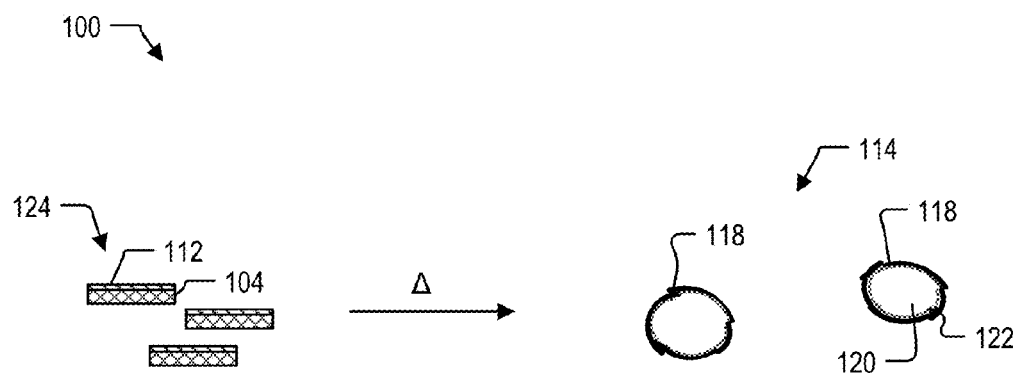
FIG. 1B is a schematic of an embodiment of a coating/film method for preparing a material of the present invention having a graphene-based shell structure.

Referring to FIG. 1B, curable organic material (e.g., curable monomers or polymers) can be coated on the surface of graphene-based structures 104 to form coated graphene-based structures having curable organic material coating 112. In some embodiments, graphene-based structures 104 can be dispersed on a substrate and the exposed face coated with one or more monomers capable of forming a thin film upon curing. In a non-limiting example, graphene-based structures 104 can be coated with a curable organic material using spin-coating methods. In certain embodiments, the exposed face of the graphene-based structure is coated with a polymer or monomer that is subsequently cross-linked to form the polymer or monomer film or coating. The resulting film or coating can have a thickness of less than 100 nm, 90 nm, 80 nm, 70 nm, 60 nm, 50 nm, 40 nm, 30 nm, 20 nm, 10 nm, 5 nm, or from 2 to 10 nm. Coated graphene structures (or composition) 124 can be subjected to curing conditions (e.g., heated) to allow the coated graphene-based structures to self-assemble to form hollow graphene-based structures 114. Coated graphene structures (or composition) 124 can be subjected to conditions suitable to cure the organic material coatings or films present on the graphene-based structures, thereby allowing the graphene-based structures to self-fold and combine together to form a shell around the core nano- or microstructures. For example, the composition can be irradiated with ultraviolet light and/or heated under mild conditions until the organic material coating or film 106 is sufficiently cured. In some embodiments, the solution or composition can be heated to a temperature of 15° C. to 400° C., 20° C. to 300° C., 25° C. to 200° C., 30° C. to 100° C., 40° C. to 90° C., 50° C. to 80° C., 60° C. to 70° C. or any range or temperature there between for a time suitable to cure the organic material (e.g., 0.5 min to 300 min, or 10 min to 180 min, etc.). Without wishing to be bound by theory, it is believed that the curing of the organic material coating can induce stresses leading to positive curvature on the graphene-based structure surface, thereby forming a concave portion and a convex portion, the concave portion forming the inner portion of the shell and the convex portion forming the outer surface of the shell. The curvature of the graphene-based structures can be controlled by any one of, or any combination of, the coating thickness, curing temperature, and/or curing duration. Furthermore, during curing, the thermoset polymer (e.g., an epoxy resin) can become tacky and can adhere to the uncoated surfaces of other graphene-based structures during the self-assembly process, thereby further promoting self-assembly of the shell. In some embodiments, curing of the organic material forms a polymeric film. The polymeric film can have a thickness of less than 100 nm, 90 nm, 80 nm, 70 nm, 60 nm, 50 nm, 40 nm, 30 nm, 20 nm, 10 nm, 5 nm, or from 2 to 10 nm. After curing is completed, graphene-based shell structure 114 having polymer coating 122 and hollow space 120 can be isolated using conventional solid/liquid separation techniques (e.g., centrifugation, filtration, and the like) and dried as described for FIG. 1A.

3. Preparation of Core/Graphene-Based Shell Structures—In Situ Process

Figure 2:
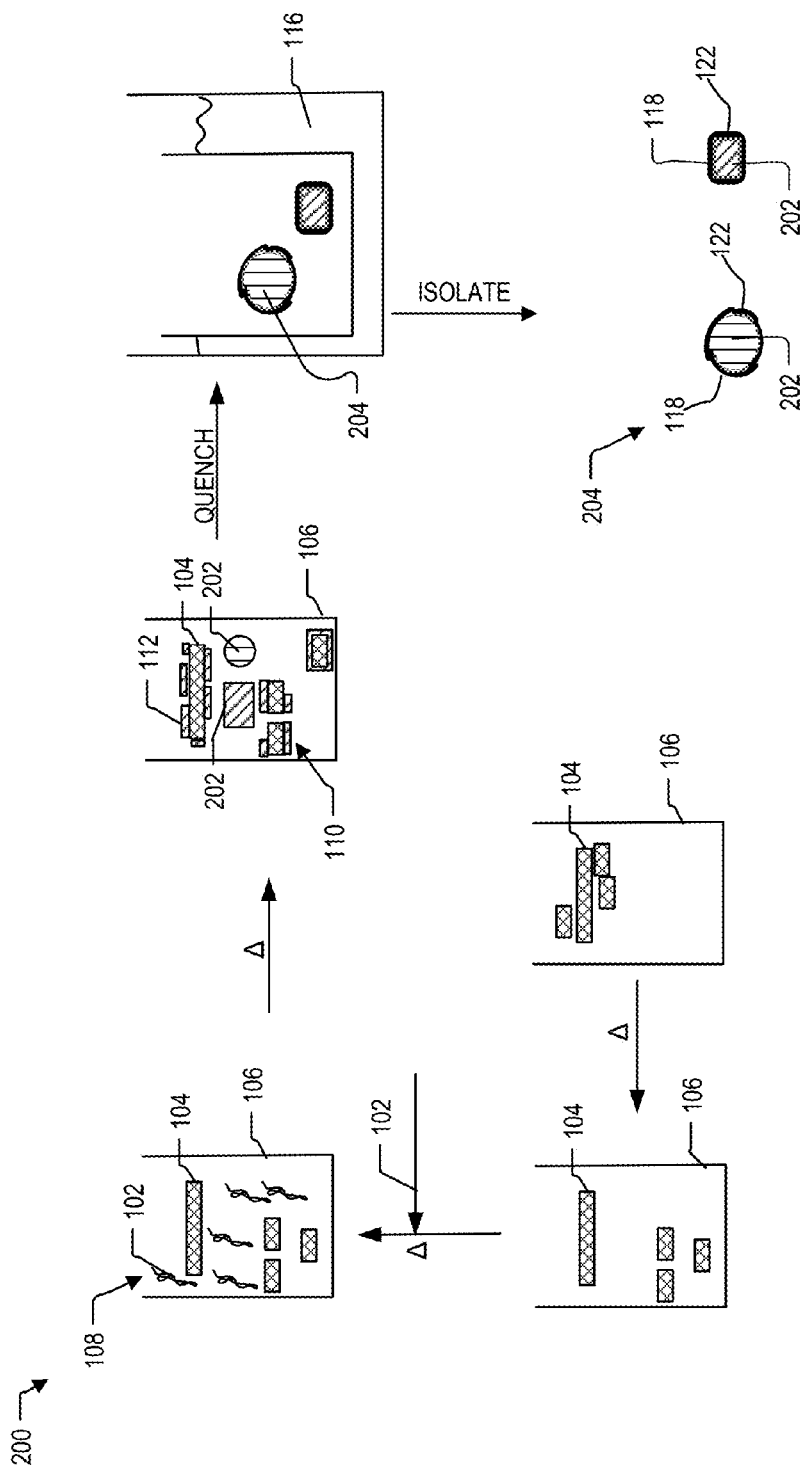
FIG. 2 is a schematic of an embodiment of an in situ method for preparing a material of the present invention having a core/graphene-based shell structure.
Figure 10:
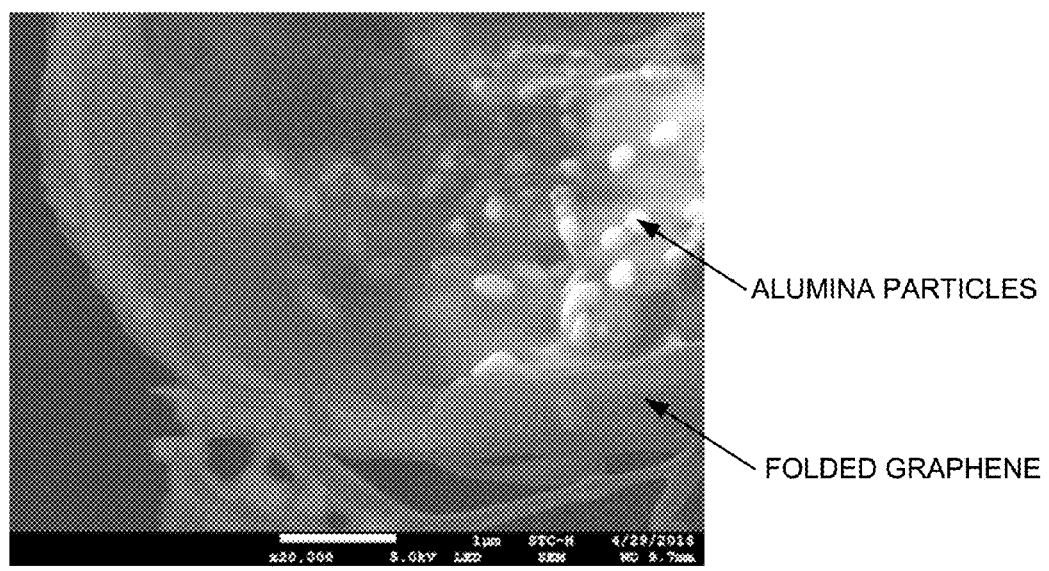
FIG. 10 is a SEM image of the self-assembled graphene-base material of the present invention with alumina nanoparticle cores.

Referring to FIG. 2, method 200 can include obtaining a composition that includes a solvent (e.g., an organic solvent or water), core nano- or microstructures (e.g., a metal oxide nanostructure) and graphene-based structures (e.g., graphene-based flakes) having a surface coated with a curable organic material and subjecting the composition to conditions to cure the organic material, and then quenching the composition to allow self-assembly or folding of the graphene-based structures around the nano- or microstructures, thereby forming a graphene-based shell. The coated graphene-based structures 110 can obtained as described in FIG. 1A. Nano- or microstructures 202 of various sizes and shapes can be added to reaction unit 106. Two core nano- or microstructures 202 and four curable organic material coated graphene-based structures 110 are shown, however, it should be understood many nano- or microstructures of various sizes and shapes and many coated graphene-based structures can be used. In some embodiments, nano- or microstructures 202 of are nano- or microstructure precursor material. Addition of the nano- or microstructures 202 to reaction vessel can be done at any time and can be timed to grow nano- or microstructures of a desired size. For example, to obtain microstructures, the nanostructures 202 are added at about the half-way time period of the curing cycle so that the nanostructures grow into microstructures. Conversely, when nanostructures are desired, or no growth of the nano- or microstructures is desired, the nano- or microstructures 202 are added at the end of the curing conditions and/or right before the coated graphene-based structures 110 are subjected to quenching conditions. The addition time can be determined based on the curing time cycle (e.g., 10 to 15 minutes prior to quenching). After heating, the mixture of coated graphene-based structures 110 and nano- or microstructures 202 can be quenched under conditions sufficient to allow the coated graphene-based structures to self-assemble around the nano- or microstructures to form core/graphene-based shell structures 204. Quenching conditions can include reducing the temperature of coated graphene-based structures 110 to less than 30° C., less than 25° C., less than 20° C., less than 10° C., less than 5° C., less than 0° C. or less than −10° C. or any range or value there between. The reduction of temperature can be at a rate of 10° C. per min or more, 20° C. per min or more, 50° C. per min or more. Quenching can also be performed by plunging the reaction unit 106 into vessel or bath 116 at a temperature of −50° C. to −80° C. (e.g., a dry ice-acetone bath). The temperature reduction is sufficient to induce stresses leading to positive curvature on the graphene-based structure surface, thereby forming a concave portion and a convex portion, the concave portion forming the inner portion of the shell and the convex portion forming the outer surface of the shell. Core/graphene-based shell structures 204 can include shell 118, core 202, and polymer coating 122. Polymer coating 122 can be on the inside surface and/or the outside surface of the structure. The coating can be a full coating or a partial coating on each surface of the shell. (See, for example, FIGS. 10 and 11 in the Examples).

4. Preparation of Core/Graphene-Based Shell Structures—2 Vessel Process

Figure 3:
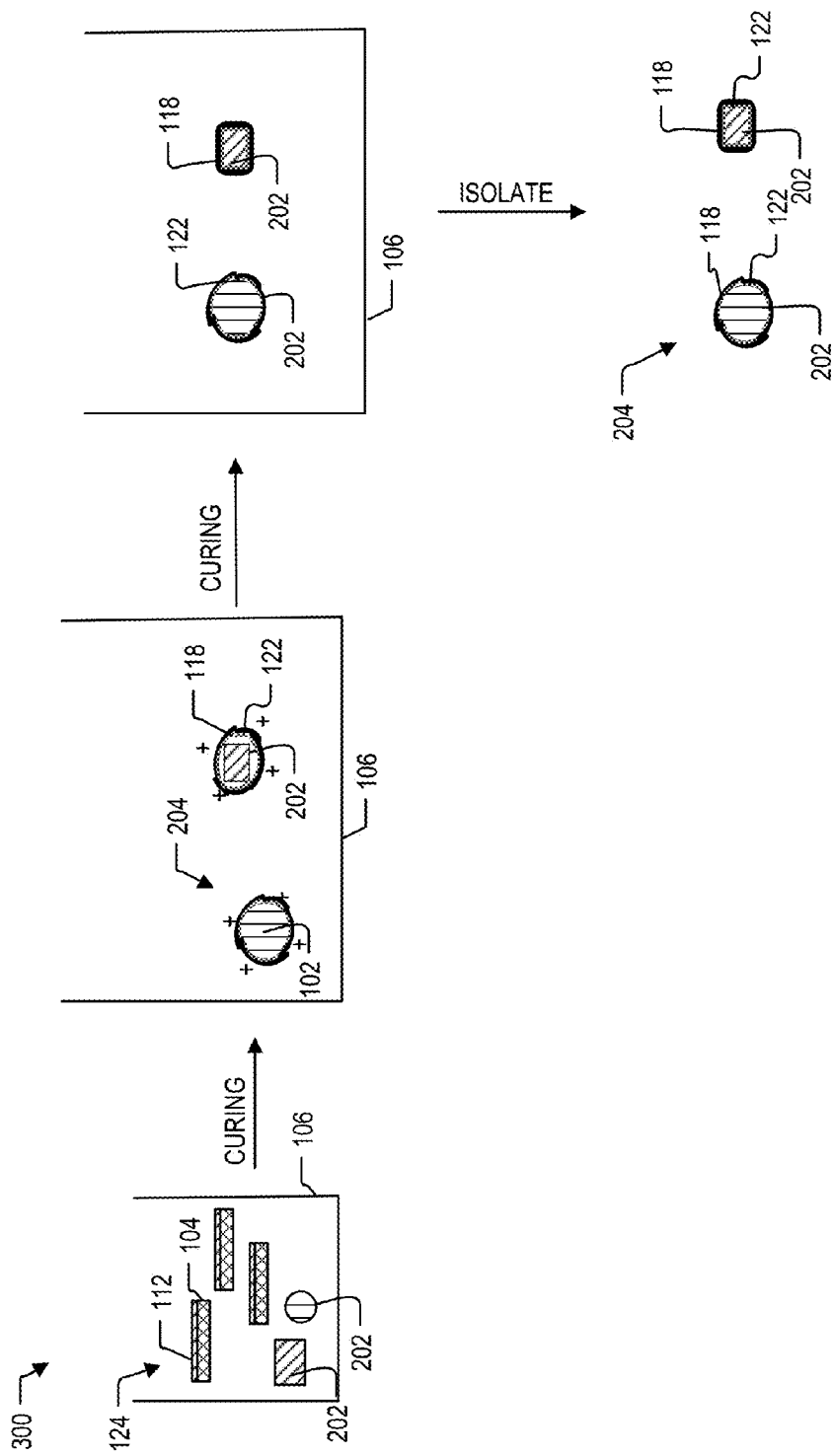
FIG. 3 is a schematic of an embodiment of a coating/film method for preparing a material of the present invention having a core/graphene-based shell structure.

In some embodiments, a graphene-based structure can be dispersed on a substrate and the exposed face coated with the curable organic material, which can form a thin film upon curing. FIG. 3 depicts a schematic for method 300 to prepare core/graphene-based shell structures. In certain embodiments, the curable organic material includes a polymer or monomer that is cross-linked to form the polymer film. The polymer film can have a thickness of less than 100 nm, 90 nm, 80 nm, 70 nm, 60 nm, 50 nm, 40 nm, 30 nm, 20 nm, 10 nm, 5 nm, or from 2 to 10 nm). A pH of the solution can be adjusted to maintain the nano- or micro structures and the graphene-based structures at or above their isoelectric point. For example, the pH can range from 2 to 13, preferably 5 to 9, more preferably from 6 to 8, or most preferably 6.5 to 7.5. Adjustment of the pH to the isoelectric point of the nano- or microstructures can facilitate an electrostatic attraction between the graphene/monomer and the nano- or microstructures during the curing of the polymer to form a polymeric matrix. In some embodiments, the folding of the graphene can enable encapsulation without manipulating the pH of the solution.

The composition can be subjected to conditions suitable to cure the organic material present on the graphene-based structures, thereby allowing the graphene-based structures to self-fold and combine together to form a shell around the core nano- or microstructures. For example, the composition can be irradiated with ultraviolet light and/or heated under mild conditions until the coating 112 is sufficiently cured. In some embodiments, the solution or composition can be heated to a temperature of 15° C. to 400° C., 20° C. to 300° C., 25° C. to 200° C., 30° C. to 100° C., 40° C. to 90° C., 50° C. to 80° C., 60° C. to 70° C. or any range or temperature there between for a time suitable to cure the organic material (e.g., 0.5 min to 180 min.). As shown in FIG. 3, the self-assembly of the coated graphene-base structure occurs with the curable organic material coated surface 112 of the graphene-based structures 104 are proximate to the nano- or microstructures 202. Without wishing to be bound by theory, it is believed that the curing of the organic material (e.g., polymer, monomer, etc.) coating can induce stresses leading to positive curvature on the graphene-based structure surface, thereby forming a concave portion and a convex portion, the concave portion forming the inner portion of the shell and the convex portion forming the outer surface of the shell. This positive curvature coupled with or without the electrostatic attraction between the core nano- or microstructure and the coated surface of the graphene-based structures facilitates self-assembly of the graphene-based structures around the core nano- or microstructures. The curvature of the graphene-based structures can be controlled by any one of, or any combination of, the coating thickness, curing temperature, and/or curing duration. In addition, adjusting the pH of the composition to be the same or near the isoelectric point (pI) of the nano- or microstructures and the graphene-based structure having the curable organic material coating can further facilitate an electrostatic attraction between these materials, thereby further promoting shell formation and encapsulation of the core structure. It is also believed that similar charging on the positive curvature of two graphene-based structures will repel each other while folding takes place, thereby maintaining uniform dispersion during the process and inhibiting aggregation of graphene-based structures. Furthermore, during curing, the thermoset material (e.g., an epoxy resin) can become tacky and can adhere to the uncoated surfaces of other graphene-based structures during the self-assembly process, thereby further promoting self-assembly of the shell. In some embodiments, curing of the organic material forms a polymeric film. The polymeric film can have a thickness of less than 100 nm, 90 nm, 80 nm, 70 nm, 60 nm, 50 nm, 40 nm, 30 nm, 20 nm, 10 nm, 5 nm, or from 2 to 10 nm. After curing is completed, encapsulated core/graphene-based shell structure 204 can be isolated using conventional solid/liquid separation techniques (e.g., centrifugation, filtration, and the like) and dried. The encapsulated core nano- or microstructure/graphene-based shell structure 204 includes core nano- or microstructure 202 and coated graphene-based shell 118. In some embodiments, the polymer coating 122 can be partially or fully removed through heating of the core/graphene-based shell structure.

5. Loading of Nano- or Microstructures

Figure 4A:
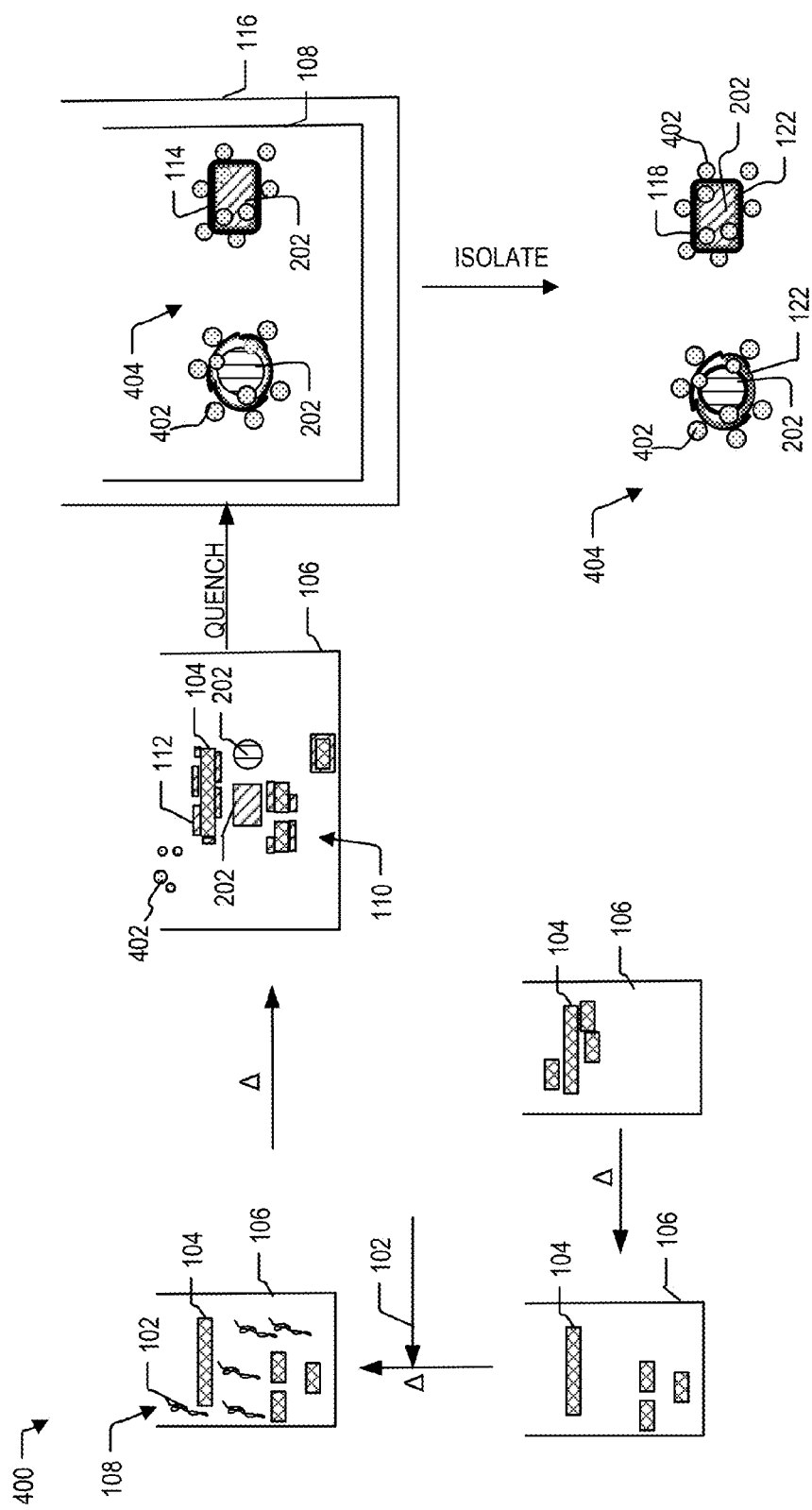
FIG. 4A is a schematic of an embodiment of an in situ method for preparing a material of the present invention having a core/graphene-based shell structure with nano- or microstructures dispersed on the surface of the graphene-based shell.

Prior to, or during, the curing process (See, FIGS. 1A, 1B, 2 and 3 above), additional (second) nano- or microstructures or nano-microstructure precursors can be added to reaction unit 105 (e.g., added to compositions containing coated graphene-based structures 110 or to core/graphene-based shell structures 204. The additional nano- or microstructures can be selected for their catalytic ability or a desired application. FIG. 4A depicts the addition of nano- or microstructures 402 to coated graphene-based structures 110 during the curing (See, FIG. 2). In some embodiments, core nano- or microstructures 202 are not present and the nano- or microstructures 402 are added to coated graphene-based structures 110 during the curing (See, FIG. 2). In some embodiments, when benzyl alcohol is used as a solvent, nanoparticle precursor material (e.g., metal salts) can be reduced into metal nanoparticles at the organic material curing temperature. By way of example, gold (Au), Pt, Pd, Sn, or bimetallic nanoparticles can obtained by benzyl alcohol reduction of $HAuCl_4$ to Au(0), $H_2PtCl_6$ to Pt(0), $H_2PdCl_4$ to Pd(0), or $SnCl_4$ to Sn(0), or combinations thereof (e.g., a bimetallic metal of Pt and Sn).

Figure 4B:
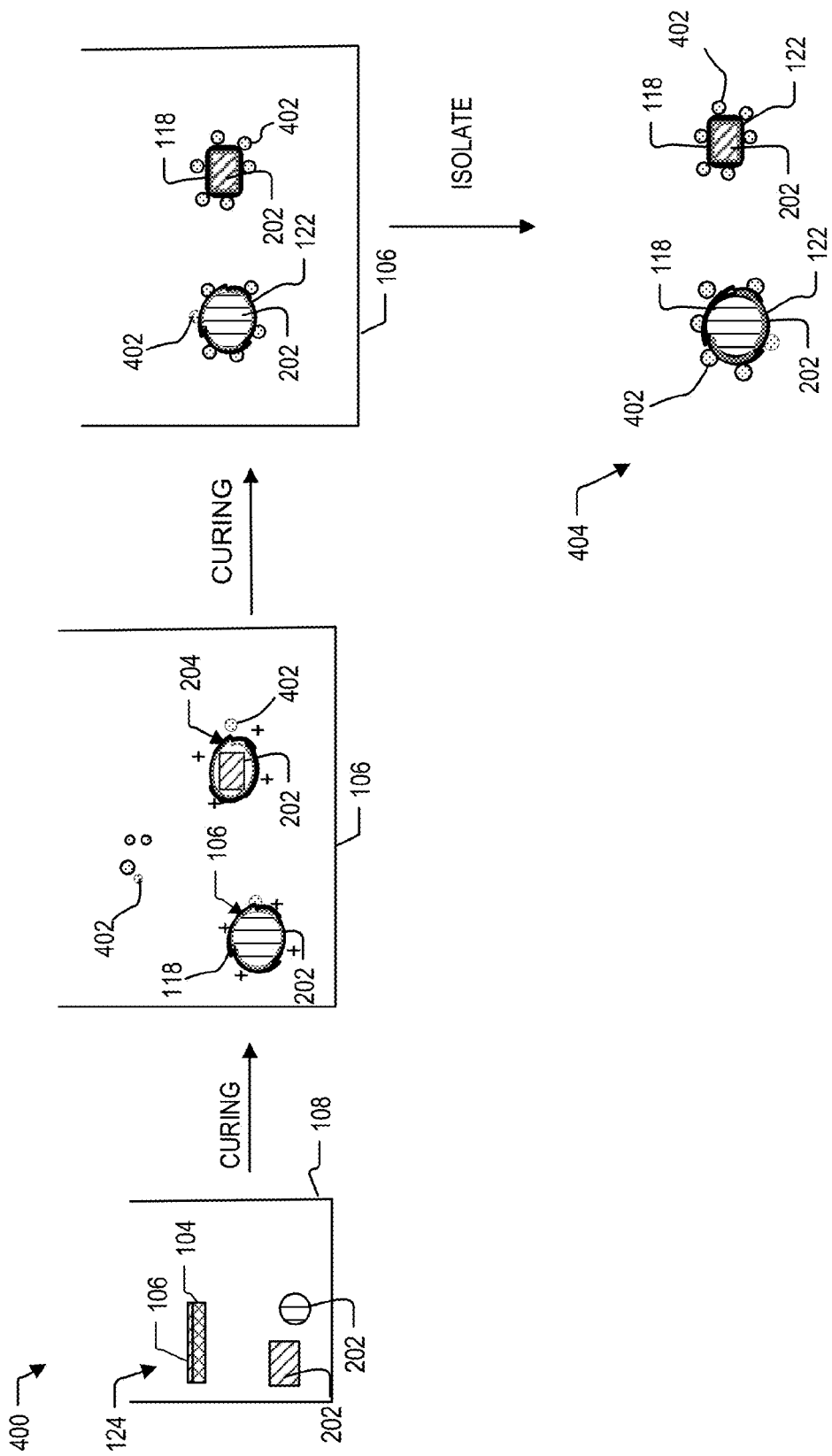
FIG. 4B is a schematic of an embodiment of film/coating method for preparing a material of the present invention having a core/graphene-based shell structure with nano- or microstructures dispersed on the outer surface of the graphene-based shell.
Figure 4C:
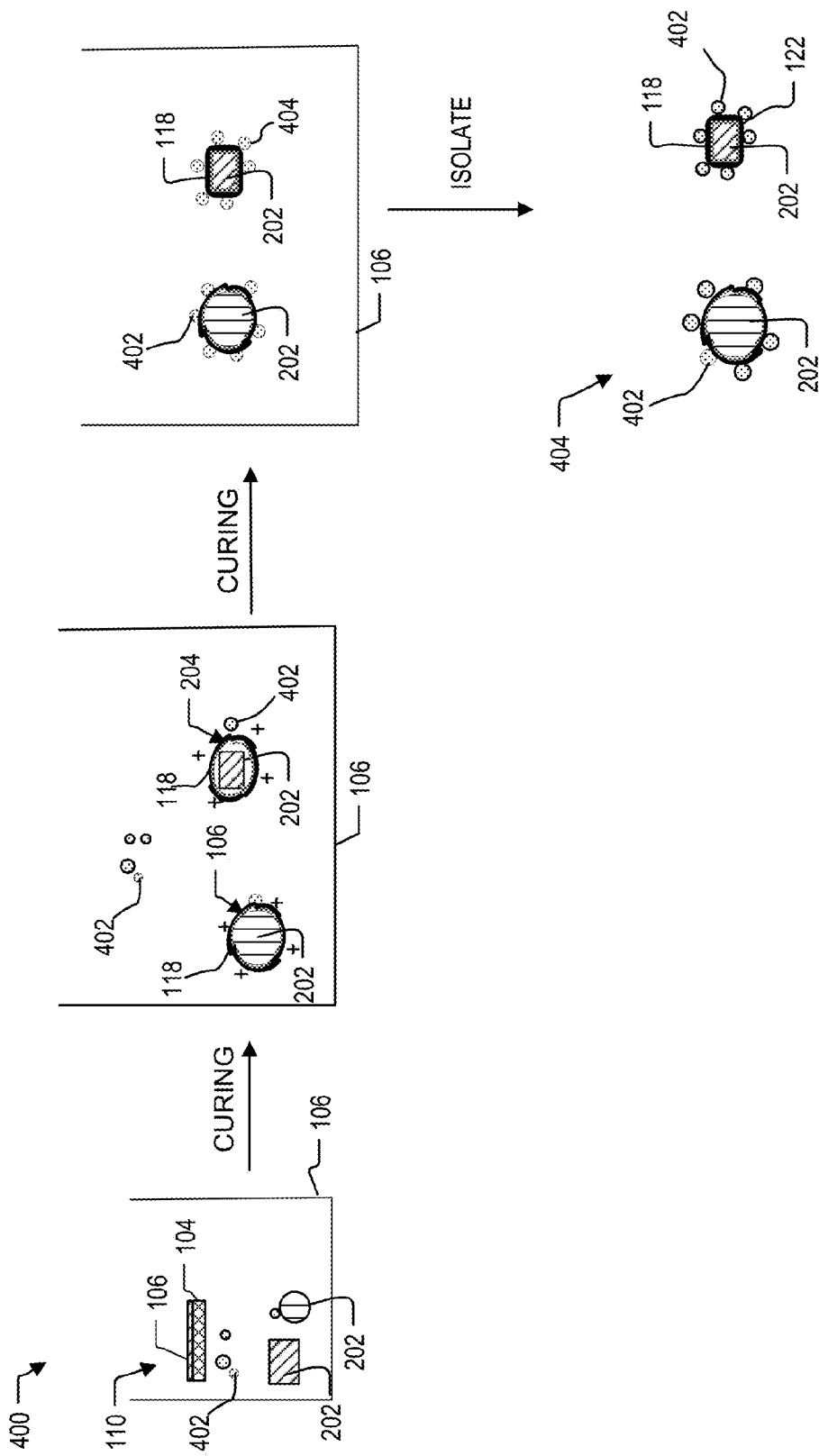
FIG. 4C is a schematic of another embodiment a film/coating method for preparing a material of the present invention having a core/graphene-based shell structure with nano- or microstructures dispersed on the outer surface of the graphene-based shell where the addition of nano- or microstructures to composition occurs prior to, and during curing.
Figure 4D:
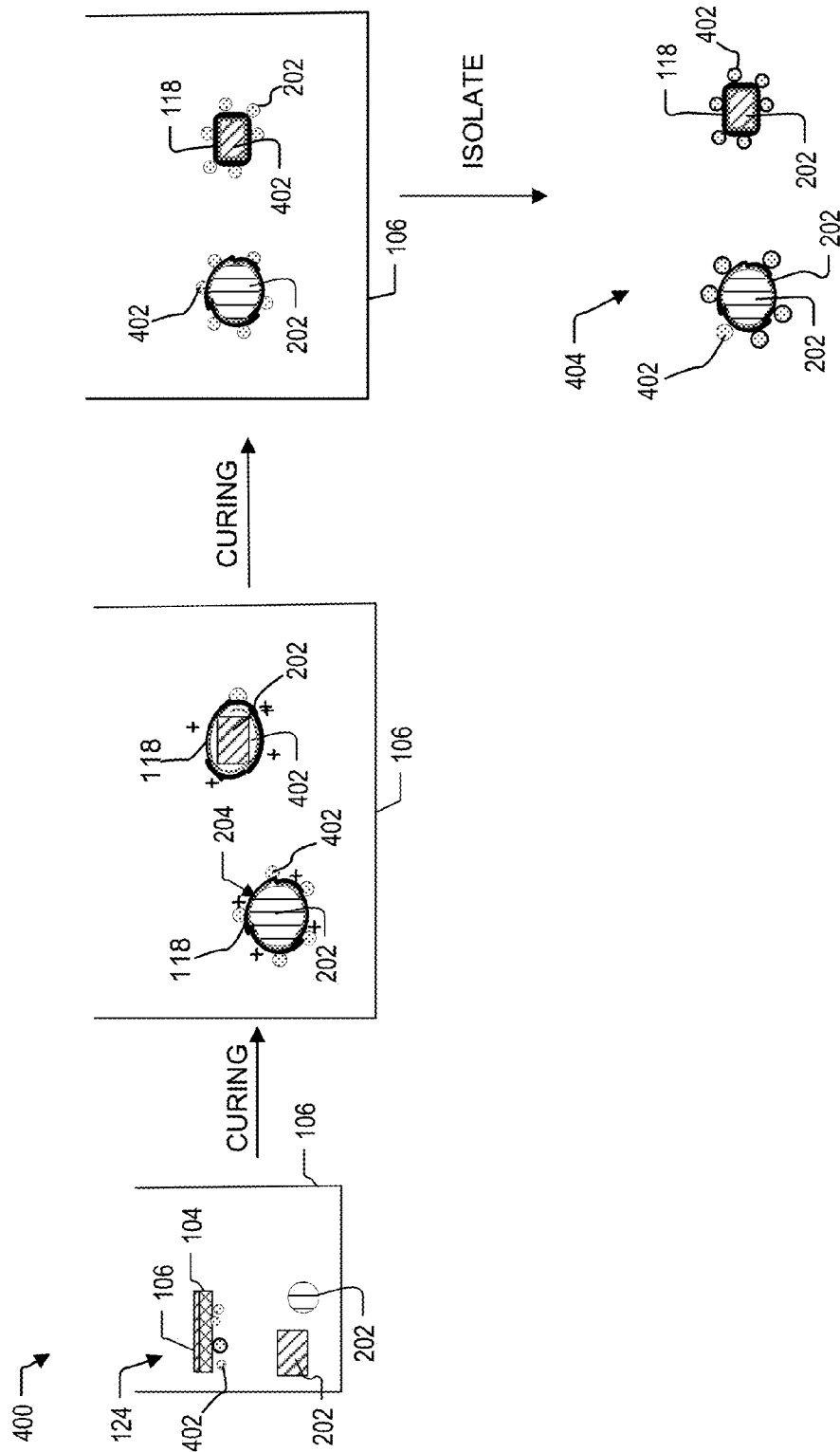
FIG. 4D is a schematic of another embodiment for preparing a material of the present invention having a core/graphene-based shell structure with nano- or microstructures dispersed on the outer surface of the graphene-based shell where the addition of nano- or microstructures are on the obtained graphene-based structure.
Figure 4E:
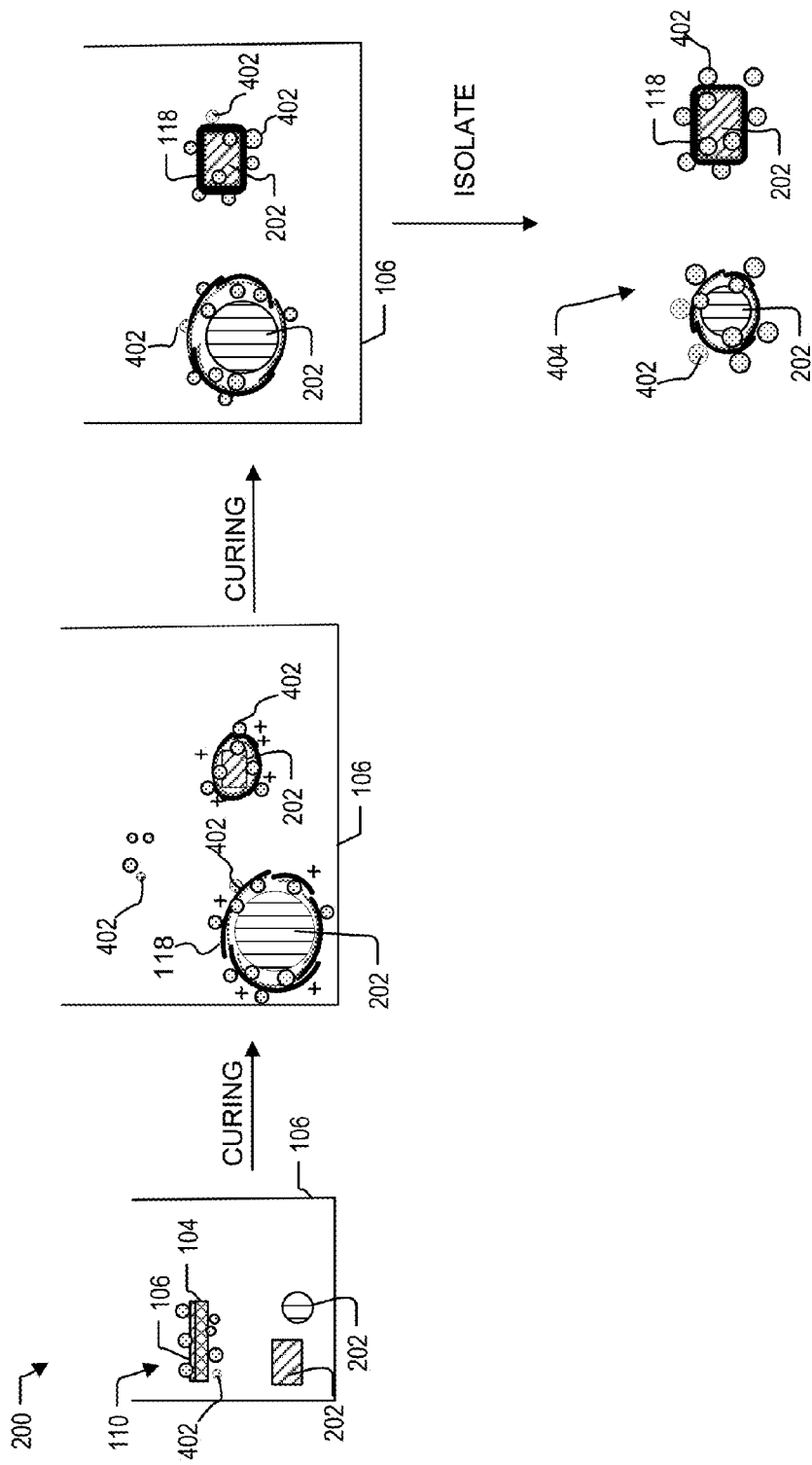
FIG. 4E is a schematic of another embodiment for preparing a material of the present invention having a core/graphene-based shell structure with nano- or microstructures dispersed on the inner and outer surface of the graphene-based shell where the addition of nano- or microstructures are on the obtained graphene-based structure.

In another embodiment, the nano- or microstructures 402 can be added to graphene-based structures 114 or core/graphene-based shell structures 204 using known deposition methods (e.g., chemical deposition, impregnation, or the like). FIG. 4B depicts the addition of nano- or microstructures 402 to coated graphene-based structures 124 (See, FIGS. 1A and 2). FIG. 4C depicts the addition of nano- or microstructures 402 to the composition containing coated graphene-based structures 110 prior to, and during curing of a film coating on the graphene-based nanostructures (See, FIGS. 1B and 2). FIG. 4D depicts the addition of nano- or microstructures 402 loaded on the graphene-based structures 104 prior to forming composition 204. FIG. 4E depicts the addition of nano- or microstructures 402 to film coated graphene-based structures 124 prior to, and during curing, where the nano- or microstructures are attached to the inner and outer surface of film coated graphene-based structures 124. The ability to add the additional (non-core) nano- or microstructures prior to or during the curing and/or to load them onto the graphene-based structures prior to adding the graphene allows for tunability of the morphology, structure and properties of the nano- or microstructures, the core, or the graphene-based structures. In some embodiments, the nano- or microstructures 402 can be supplied to compositions 110 or 124 as a metal precursor solution described below. Other ingredients known to facilitate nucleation and growth of nano- or microstructures (e.g., reducing agents, surfactants, templating agents, structuring agents, and the like) can be added to the compositions 110 and 124. In a non-limiting example, a solution of Pt(IV) compound, ascorbic acid and polyvinylpyrrolidone (PVP) can be added to composition 124 to facilitate nucleation of a specific shape and size of the platinum nano- or microstructures. The nucleation can be rapid and can occur in tens of seconds to produce less than 5 nm size of Pt nanostructures. The nano- or microstructures can deposit on the coated side, uncoated side, or both sides the graphene-based structures. The deposition of the nano- or microstructures can occur simultaneously or almost simultaneously as folding of the graphene-based structures. As shown in FIGS. 4B-D, the nano- or microstructures are deposited on the uncoated (outer) side of the graphene-based structures. As shown in FIGS. 4A and 4D, the nano- or microstructures are deposited on the coated (inner) and uncoated (outer) side of the graphene-based structures. In some embodiments, the additional nano- or microstructures are deposited in the core material and the graphene-based structures. For example, in FIG. 4D, the nano- or microstructures 402 can be loaded on core nano- or microstructures 104 prior to curing. After curing, core/graphene-based/nano- or microstructure shell material 404 is formed. The material 404 includes core 202, graphene-based shell 118, and nano- or microstructures 402. In another example, in FIG. 4E, the nano- or microstructures 402 can be loaded on the inner and outer surfaces of the graphene-based structures prior to curing. After curing, core/graphene-based/nano- or microstructure shell material 404 is formed. The material 404 includes core 202, graphene-based shell 118, and nano- or microstructures 402.

6. Addition of Other Carbon Species

In some embodiments, carbon species other than graphene-based structures can be added to compositions 110 or 124, prior to, or during curing of the organic material coating. The carbon species can be incorporated into or grafted on the graphene-based structure. In some embodiments, after curing, the carbon species can be removed by heating the core/graphene-based shell structure thereby increasing the porosity of the graphene-based shell. Non-limiting examples of carbon species include a hydrocarbon, a sugar-based compound (e.g., glucose, sucrose, polysaccharides, chitosan, glucose oxidase, and the like), a sulfonated carbon compound, nitrogen-based carbon compound (polypyrrole), carbon-based monomer, an aromatic compound (e.g., xylene), a metal-complexed carbon-based compound (e.g., ferrocene) or any combination thereof. In some embodiments, incorporation of the carbon species in the core/graphene-based shell structure can be included in an article of manufacture or be involved in the manufacture of sensors, biosensors, electrodes, optical/plasmonic device, filters, controlled release media such as in fertilizers and personal care products, energy storage devices (e.g., fuel cells, batteries, and supercapacitors), and the like.

7. Removal of Core Material

In some embodiments, a portion or all of core nano- or microstructures 202 can be removed. Removal of a portion of the core nano- or microstructures 202 can result in a yolk/shell type structure. By way of example, core/graphene-based shell structures 204 or 404 can be contacted with an etching solution (e.g., immersed in 10 wt. % HF aqueous solution) for a desired amount of time (e.g., for 5 to 30 minutes) to partially remove the core nano- or microstructures 202 from the graphene-based shell structures 204 or 404. To form a hollow graphene-based shell structure, the core/graphene-based shell structures 204 or 404 can be contacted with an etching solution for a longer period of time to completely remove the core nano- or microstructures 202 from the graphene-based shell structures 204 or 404 to form a discrete void space where the core nano- or microstructure 202 used to be. Alternatively, higher concentration of the etching agent, or more powerful etching agents can be used at a similar etching period of time to obtain the desired core/graphene-based shell structure. Non-limiting examples of etching agents that can be used include hydrofluoric acid (HF), ammonium fluoride ($NH_4F$), the acid salt of ammonium fluoride ($NH_4HF_2$), sodium hydroxide (NaOH), nitric acid ($HNO_3$), hydrochloric acid (HCl), hydroiodic acid (HI), hydrobromic acid (HBr), boron trifluoride ($BF_3$), sulfuric acid ($H_2SO_4$), acetic acid ($CH_3COOH$), formic acid (HCOOH), or any combination thereof. In a certain embodiments, HF, $NH_4F$, $NH_4HF_2$, NaOH or any combination thereof can be used (e.g., in instances where a silica coating is removed from the surface of the nanostructure). In some embodiments, $HNO_3$, HCl, HI, HBr, $BF_3$, $H_2SO_4$, $CH_3COOH$, HCOOH, or any combination thereof can be used (e.g., to remove an alumina coating from the surface of the nanostructure). In another embodiment, a chelating agent (e.g., EDTA) for $Al^{3+}$ can be added as an aid for faster etching of alumina in addition of above stated acids.

8. Addition of Second Shell

The graphene-based structures 114 and/or core/graphene-based structures 204 and 404 can be encompassed in a second shell. The second shell can be a metal oxide or mixed metal oxide shell. Non-limiting examples of metal oxide shell selected from silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or a composite shell comprising any combination thereof. Combinations thereof can form the mixed metal oxide shell. In a particular embodiment, the shell is a hydrotalcite (e.g., MgAlGa(O)) shell.

In one non-limiting aspect, after being made, graphene-based structures 114 and/or core/graphene-based structures 204 and 404 can be introduced into an aqueous solution (e.g., water, sodium carbonate, and mild sodium hydroxide) containing nitrates of metals (e.g., Mg, Al, Ga, In, or mixtures thereof) to produce a salt coated graphene-based structure. In one embodiment, a mixture of magnesium and aluminum nitrates in a 3:1 to 5:1, or about 5:1 ratio can be used. A solution that include carbonates of metals (e.g., Na, Ca, K) and base (e.g., NaOH, KOH or the like) at 40 to 100° C., 50 to 80° C., or about 60° C. The solution can be aged at room temperature. In some embodiments, the solution is heated to a temperature of about 50° C., 60° C., 70° C., 90° C. to 110° C., or 100° C. for a specific duration (minutes to hours) to form the second or outer shell. The final solution can then be further calcined at a temperature of about 300° C. to 900° C., or 400° C. to 800° C., or 500° C. to 700° C. The reaction duration, temperature, environment, and pressure can facilitate (1) control over the thickness of the calcined second shell (e.g., calcined hydrotalcite-type shell), (2) formation of interfaces between the calcined second shell and nanoparticles and/or the graphene-based shell, and (3) the overall composition of the second shell.

Sequential coatings can be prepared by repeating this process or by coating the graphene-base structures repeatedly with metal salt solutions. By way of example, graphene-based structures 114 and/or core/graphene-based structures 204 and 404 can be introduced into an aqueous solution (e.g., water, sodium carbonate, and mild sodium hydroxide) containing nitrates of metals (e.g., Mg, Al, Ga, In, etc.) to produce salt coated graphene-based structures. The salt coated graphene-based structures can be washed, separated (e.g., filtration or centrifugation), and then dried. The salt coated graphene based structures can be introduced into a solution that include carbonates of metals (e.g., Na, Ca, K) and base (e.g., NaOH, KOH or the like) at 40 to 100° C., 50 to 80° C., or about 60° C. The final mixture can be aged (non-agitated) for a desired amount of time (e.g., 5 to 18 h, or about 12 h), washed, separated, and dried (e.g., at 60 to 90° C., or about 80° C. for 5 to 18 h, or about 12) to form a multi-coated graphene-based structure. The multi-coated graphene-based structure can be calcined (e.g., heated in the presence of an oxygen source such as air) at a temperature of about 300° C. to 900° C., or 400° C. to 800° C., or 500° C. to 700° C. for about 1 to 10 h, or about 5 h. The thickness of the shell can be 1 micron to 50 micron, 10 micron to 40 micron, or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 microns thick. A thin shell can be 1 to 15 microns thick and a thick shell can be 16 to 40 microns thick.

Figure 5A:
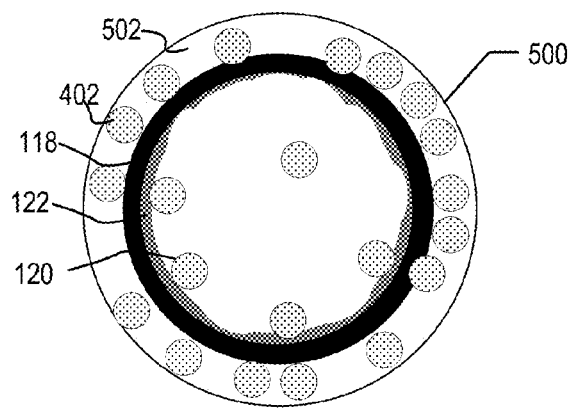
FIG. 5A is a cross-sectional illustration of a graphene-based shell materials of the present invention.
Figure 5B:
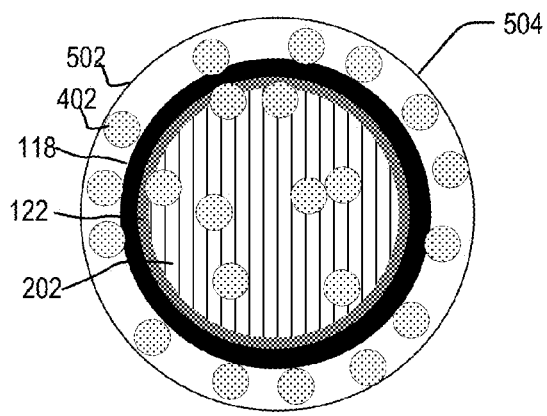
FIGS. 5B and 5C are cross-sectional illustrations of core/graphene-based shell materials of the present invention.
Figure 5C:
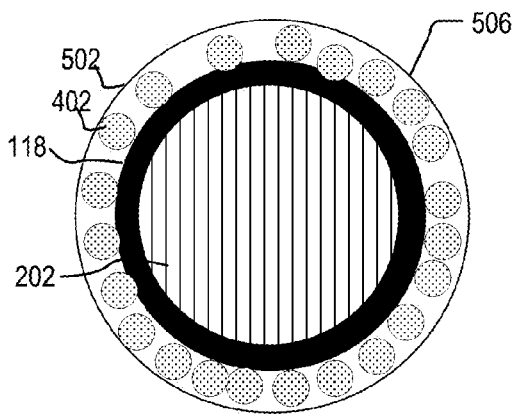

The graphene-based multi-shell structures and/or core-graphene-based multi-shell structures can have a powder morphology. FIGS. 5A, 5B and 5C graphene-based multi-shell structures and/or core-graphene-based multi-shell structures. FIG. 5A depicts graphene-based shell structure 500, which includes, cured organic material 122, graphene-based shell 118, nano- or micro-particles 402, and calcined second shell 504 made using the quench process described in FIGS. 1, 2 and 4. As show, cured organic material 122 is not an even coating due to the partial coating of the graphene-based structure. FIG. 5B depicts core/graphene-based shell structure 504, which includes core nano- or microstructure 202, cured organic material 122, graphene-based shell 118, nano- or micro-particles 402, and calcined second shell 504. Cured organic material 122 can be formed from curing of coating 112 on graphene-based nanostructures 104. FIG. 5C depicts core/graphene-based shell 507, which does not include the cured organic material 122 (e.g., removal of the polymer coating or film through heat or etching). Core/graphene-based shell structure 506 can include a core nano- or microstructure 202, a graphene-based shell 118, nano- or micro-particles 402, and the calcined second shell 502.

Formation and calcination of a layered hydroxide type shell can provide morphological tuning and re-dispersion of the nano- or microparticles dispersed on the graphene-based shell. For example, when calcined hydrotalcite-type shell structure 502, 504 and/or 506 is used as a catalyst, aluminum can enable uniform dispersion of the metal oxides, and gallium insertion into Pt nanostructures can assist in maintaining the small size of the Pt nanoparticles. Magnesium in the second shell can impart sufficient acidic sites to mitigate coking of exposed Pt metal. Mitigation of coking can lengthen catalyst life and/or time on stream for the catalyst. For example, during an alkane dehydrogenation process, the Pt catalyst can become electron rich such that electronic interaction between the second shell 502 and graphene-based shell 118 can occur. This type of electronic interaction could result in optimal conditions for the product (e.g., alkene) to leave the surface of the catalyst, thereby allowing for higher selectivity and conversion efficiency of the alkane dehydrogenation reaction.

9. Multi-Layered Structures

The above-described methods can be combined with one another to form various multi-layered structures. The layered structures can be selected and/or tuned to provide specific applications, (e.g., catalysis properties to a chemical application, electronic applications or devices, or the like). In one non-limiting embodiment, the produced graphene-based shell structures and/or core/graphene-based shell structure having second nano- or microstructures on the surface of the graphene-based shell 118 can be dispersed in a second composition that includes graphene-based structures 104 and coating 112. Coating 112 includes the curable organic material 102. The resulting second composition can be subjected to conditions that cure the coating 112 as previously described above, and allow the graphene-based structures to self-assemble around the produced graphene-based shell structure and/or core/graphene-based shell structure to produce a core/graphene-based shell/nano-microstructure/graphene-based shell structure or a graphene-based shell/nano-microstructure/graphene-based shell structure. These multiple graphene-based shell structures can then be treated with additional nano- or microstructures, carbon species, etched to form a yolk/shell or a hollow shell and/or be encompassed in another shell as previously described. In another non-limiting embodiment, a graphene-based structure shell (third shell) can be formed around a core/graphene-based shell/nano- or microstructures/calcined second shell structure (e.g., structures 500, 504 and 505 in FIG. 5). The three-shell structure can be formed by dispersing the graphene-based shell/second shell structures (core and/or no core structures) to a second composition that includes graphene-based structures 104 coated with the curable organic material 102. The second composition can be subjected to conditions that cure the organic material, and allow the graphene-based structures to self-assemble and form the third shell. The three-shell structure can be isolated and used in a wide range of applications (e.g., as a catalyst in a wide range of chemical reactions, non-limiting examples of which are provided below or other applications). Other applications of the architecture include a sensor, a filter, a controlled release media (e.g., fertilizer, personal care products (e.g., deodorants, soap, shampoos, and detergents)), energy storage device (e.g., fuel cells, batteries, and supercapacitors), a plasmonic device or an optical device. It should be understood that the three-shell structure or the multiple graphene-based shells structure can then be treated with graphene-based structures, nano- or microstructures, carbon species, or encompassed with another non-graphene based shell to produce multi-functional type materials or catalysts that have 4, 5, 6 or more shells. Such multi-shell or multi-compartment structures or materials can be used to catalyze multiple reactions (e.g., cascade-type catalytic reactions and 3-way automobile reactions).

B. Materials

1. Graphene-Based Structures

The graphene-based structures 104 can be any form of graphene that can be made according to conventional processes (e.g., exfoliation or modified Hummer's method as described in the Examples) and or purchased through a commercial vendor. Non-limiting examples of such compounds include graphene, a graphene layer, a bilayer graphene, a trilayer graphene, a multi-layer graphene, a few-layer graphene, a graphene quantum dots, a graphene oxide, a reduced graphene oxide, graphite oxide, reduced graphite oxide, or other derivatives of graphene as defined herein. The graphene-based structures can have a film or flake or flattened morphology. The graphene-based structures can be deposited on a glass or silicon substrate, using conventional techniques (e.g., spin-casting), and then dried. In some embodiments, the graphene-based structures are deposited on ice using spin-casting techniques.

2. Curable Organic Material

The curable organic material can be any monomer or polymer capable of being cross-linked when exposed to heat, light or electromagnetic force. The monomers and polymers are available from commercial vendors or made according to conventional chemical reactions. In some embodiments, the curable organic material is a thermoset monomer or polymer. The curable organic material can a composition that includes a thermoplastic material and can also include one or more thermoplastic polymers or monomers, additives, and the like, that can be added to the composition. Thermoset materials are cured or become cross-linked and tend to lose the ability to become pliable or moldable at raised temperatures. Non-limiting examples of thermoset polymers include epoxy resins (e.g., epoxy vinylesters, alkyds, amino-based polymers (e.g., polyurethanes, urea-formaldehyde), diallyl phthalate, phenolics polymers, polyesters, unsaturated polyester resins, dicyclopentadiene, polyimides, silicon polymers, cyanate esters of polycyanurates, thermosetting polyacrylic resins, phenol formaldehyde resin (bakelite), fiber reinforced phenolic resins (Duroplast), benzoxazines, or co-polymers thereof, or blends thereof. In addition to these, other thermoset polymers or monomers known to those of skill in the art, and those hereinafter developed, can also be used in the context of the present invention. In some embodiments, one or more monomers capable of being polymerized when exposed to heat, light or electromagnetic force are used. Such monomers can be precursor materials suitable for forming thermoset polymers. The polymers monomers are available from commercial vendors or made according to conventional chemical reactions.

The thermoset material can be included in a composition that includes said polymers or monomers, additives, and diluents. Non-limiting examples of additives include coupling (crosslinking) agents, chain extenders, accelerators (2,4,6-tris(dimethylaminomethyl)phenol, (DMP-30)), antioxidants, heat stabilizers, flow modifiers, reactive diluents (e.g., hexanediol diacrylate), etc., non-reactive diluents, or any combinations thereof. Non-limiting examples of cross-linking agents include isophoronediamine (IPDA), diaminocyclohexane (DACH), diethylenetriamine (DETA), aminoethylpiperazine (AEP), and mixtures thereof. Non-limiting examples of non-reactive diluents include benzyl alcohol, acetone, xylene, and mixtures thereof. Non-limiting examples of chain extenders include piperazine (PIP), monoethanolamine (MEA) and mixtures thereof.

The polymer or monomer in combination with a curing agent, an active diluent, a non-reactive diluent, a crosslinking agent, chain extender, or an accelerator can be coated on the supported graphene-based structures using conventional coating techniques (e.g., spin-casting, spin-coating, or chemical vapor deposition). The ratio of polymer/monomer to curing agent can be varied to obtain a desired viscosity (e.g., a polymer solution to curing agent solution weight ratio can be 4:1, 3:1, 2.3:1, 1:1, or the like). A polymer or monomer to curing agent weight ratio can be 0.1:1, 0.5:1, 1:1, 1.1:1, 1.2:1 or any value or range there between.

The organic curable composition by combining one or more solutions of polymer or monomer solutions with a solution of curing agents. A first solution can be prepared by combining the polymer or monomer with the inactive diluent or the active diluent or both to obtain a desired viscosity or concentration. By way of example, an epoxy resin can be combined with an inactive diluent in a 10:90, 20:80:30:70, or 50:50 weight ratio of epoxy resin to inactive diluent. In a preferred embodiment, D.E.R. 332 and benzyl alcohol are combined. A second solution can be prepared by combining one or more curing agents. The second solution can include 70 to 90 wt. % of total chain extender compositions, 10 to 20 wt. % of total crosslinking agents, and 1 to 5 wt. % of total accelerators. By way of example, the second composition can include 60 to 70 wt. % of a first chain extender, 10 to 20 wt. % of a second chain extender, 10 to 20 wt. % of a crosslinking agent and 1 to 5 wt. % of accelerator. In a preferred embodiment, the second composition includes 60 to 70 wt. % MEA, 10 to 20 wt. % PIP, 10 to 20 wt. % AEP and 1 to 5 wt. % DMP-30, preferably about 68 wt. % MEA, about 14 wt. % PIP, about 14 wt. % AEP, and about 2 wt. % DMP-30. The first solution and second solution can be combined to form the curable organic material prior to adding the composition to a solution that include the graphene-based structures or directly to a graphene-based structure.

In some embodiments, a first solution can be prepared by combining a polymer or monomer and a reactive diluent to obtain a desired viscosity or concentration for providing a film to the graphene-based structures (e.g., a spin-coating process). The first solution can include a polymer of monomer and the active and/or inactive diluent in polymer/monomer to diluent weight ratio of 10:90 to 90:10, or about 20:80, 30:70, 40:60, 50:50, 60:40, 70:30, 80:20, or 90:10 or 2. A second solution can that includes the curing agents (e.g., IPDA, DETA, DACH, AEP, DMP-30 or combinations thereof) can be prepared. The solutions can be provided to the graphene structures using coating methods (e.g., spin-coating). By way of example, D.E.R 332) and the inactive diluent (e.g., benzyl alcohol or acetone) can be combined as a first solution in a desired ratio to obtain a target viscosity. A second solution that includes AEP and DMP-30 in a 98:2 weight ratio can be prepared. The first solution and the second solution can be mixed to form the curable organic material and used as a spin-coating solution to coat the graphene-based structures. The materials can be spin-coating at a speed of 100 to 10,000 rpm, or 500 to 8000, 1000 to 5000 rpm, or 2000 to 4000 rpm, or any value or range there between.

3. Nano- and Microstructure Shapes and Materials

The nano- or microstructures can be made according to conventional processes (e.g., metal oxide nano- or microstructures made using alcohol or other reducing processes) or purchased through a commercial vendor. Non-limiting examples of nano- or microstructures that can be used include structures having a variety of shapes and/or made from a variety of materials. By way of example, the nanostructures can have the shape of a wire, a particle (e.g., having a substantially spherical shape), a rod, a tetrapod, a hyper-branched structure, a tube, a cube, or mixtures thereof. In a particular instance, the nanostructures are nanoparticles that are substantially spherical in shape. Selection of a desired shape has the ability to tune or modify the shape of the resulting multi-layer structure. Non-limiting examples of nano- or micros structure materials that can be used include a metal, a metal oxide, a silicon compound, a carbon-based compound (e.g., a single or multi walled carbon nanotube), a metal organic framework compound, a zeolitic imidazolated framework compound, a covalent organic framework compound, a zeolite, or any combination thereof.

Non-limiting examples of metals include noble metals, transition metals, or any combinations or any alloys thereof. Noble metals include palladium (Pd), platinum (Pt), gold (Au), rhodium (Rh), ruthenium (Ru), rhenium (Re), osmium (Os), iridium (Ir) or any combinations or alloys thereof. Transition metals include iron (silver (Ag), Fe), copper (Cu), nickel (Ni), zinc (Zn), manganese (Mn), chromium (Cr), molybdenum (Mo), tungsten (W), or tin (Sn), or any combinations or alloys thereof. In some embodiments, the nano- or micro structure includes 1, 2, 3, 4, 5, 6, or more transition metals and/or 1, 2, 3, 4 or more noble metals. The metals can be obtained from metal precursor compounds. For example, the metals can be obtained as a metal salt, metal nitrate, a metal amine, a metal chloride, a metal coordination complex, a metal sulfate, a metal phosphate hydrate, metal complex, or any combination thereof. Examples of metal precursor compounds include, nickel nitrate hexahydrate, nickel chloride, cobalt nitrate hexahydrate, cobalt chloride hexahydrate, cobalt sulfate heptahydrate, cobalt phosphate hydrate, platinum (IV) chloride, ammonium hexachloroplatinate (IV), sodium hexachloroplatinate (IV) hexahydrate, potassium hexachloroplatinate (IV), or chloroplatinic acid hexahydrate. These metals or metal compounds can be purchased from any chemical supplier such as Sigma-Aldrich (St. Louis, Mo., USA), Alfa-Aeaser (Ward Hill, Mass., USA), and Strem Chemicals (Newburyport, Mass., USA). Metal oxides include silica ($SiO_2$), alumina ($Al_2O_3$), titania ($TiO_2$), zirconia ($ZrO_2$), germania ($GeO_2$), stannic oxide ($SnO_2$), gallium oxide ($Ga_2O_3$), zinc oxide (ZnO), hafnia ($HfO_2$), yttria ($Y_2O_3$), lanthana ($La_2O_3$), ceria ($CeO_2$), or any combinations or alloys thereof.

The metal or metal oxide nano- or microstructures can be stabilized with the addition of surfactants (e.g., CTAB, PVP, etc.) and/or through controlled surface charge. When surfactants are used, a yolk/graphene-based shell structure or a discrete void structure can be obtained after etching. In other examples, the "active" portion of the core material can be surrounded by a metal oxide (e.g., silica) and the silica can be removed during the etching process to form a yolk-shell structure.

MOFs are compounds having metal ions or clusters coordinated to organic molecules to form one-, two-, or three-dimensional structures that can be porous. In general, it is possible to tune the properties of MOFs for specific applications using methods such as chemical or structural modifications. One approach for chemically modifying a MOF is to use a linker that has a pendant functional group for post-synthesis modification. Any MOF either containing an appropriate functional group or that can be functionalized in the manner described herein can be used in the disclosed carbon nanotubes Non-limiting examples include IRMOF-3, MOF-69A, MOF-69B, MOF-69C, MOF-70, MOF-71, MOF-73, MOF-74, MOF-75, MOF-76, MOF-77, MOF-78, MOF-79, MOF-80, DMOF-1-$NH_2$, UCMC-1-$NH_2$, and MOF-69-80. Non-limiting examples of zeolite organic frameworks include zeolite imidazole framework (ZIFs) compounds such as ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-60, ZIF-62, ZIF-64, ZIF-65, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-86, ZIF-90, ZIF-91, ZIF-92, ZIF-93, ZIF-95, ZIF-96, ZIF-97, ZIF-100 and hybrid ZIFs, such as ZIF-7-8, ZIF-8-90. Covalent organic frameworks (COFs) are periodic two- and three-dimensional (2D and 3D) polymer networks with high surface areas, low densities, and designed structures. COFs are porous, and crystalline, and made entirely from light elements (H, B, C, N, and O). Non-limiting examples of COFs include COF-1, COF-102, COF-103, PPy-COF 3 COF-102-$C_{12}$, COF-102-allyl, COF-5, COF-105, COF-108, COF-6, COF-8, COF-10, COF-11A, COF-14 Å, COF-16 Å, OF-18 Å, TP-COF 3, Pc-PBBA, NiPc-PBBA, 2D-NiPc-BTDA COF, NiPc COF, BTP-COF, HHTP-DPB, COF-66, ZnPc-Py, ZnPc-DPB COF, ZnPc-NDI COF, ZnPc-PPE COF, CTC-COF, H2P-COF, ZnP-COF, CuP-COF, COF-202, CTF-1, CTF-2, COF-300, COF-LZU, COF-366, COF-42 and COF-43. Non-limiting examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

In some embodiments, the core nano- or microstructures 202 are particles. The diameter of the core nano- or microstructures 202 can be 1 nm to 5,000, 1 nm to 1000 nm, 10 nm to 100 nm, 1 nm to 50 nm, or 1 nm to 5 nm, or 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, nm, or any range or value there between. As shown, the encapsulated core material 202 is in full or substantially full contact with a portion of graphene-based shell 118. In some embodiments, 50% to 100%, 50% to 99%, 60% to 95%, or 50%, 60%, 70%, 80%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, or any range or value there between, of the surface of the core nano- or microstructures 202 contacts the graphene-based shell 118. In some embodiments, the core nano- or microstructure(s) fill 1% to 99%, preferably 30% to 60%, of the volume of the void space of the graphene-based shell, where the void space is defined as a void formed from the inner surface of the graphene-based shell and the outer surfaces of the core or yolk encapsulated within the shell.

C. Uses of the Graphene-Based Shell Structures or Core/Graphene-Based Shell Structures The produced graphene-based shell structures and/or core/graphene-based shell structures or materials of the present invention can be used in a variety of chemical reactions or energy storage devices. Non-limiting examples of chemical reactions include a hydrocarbon hydroforming reaction, a hydrocarbon hydrocracking reaction, a hydrogenation of hydrocarbon reaction, and/or a dehydrogenation of hydrocarbon reaction. The methods used to prepare the graphene-based shell structures or materials and the core/graphene-based shell structures or materials of the present invention can be modified or varied as desired to design or tune the size of the core, the selection of metal-containing particles, the dispersion of the metal-containing particles in the core, the porosity and pore size of the graphene-based shell, the thickness of the graphene-based shell, etc, to design a catalyst for a specific chemical reaction, photocatalysis, or a material for a specific application (e.g., a sensor, a filter, a controlled release media (e.g., fertilizer, personal care products (e.g., deodorants, soap, shampoos, detergents), energy storage device (e.g., fuel cells, batteries, and supercapacitors), a plasmonic device or an optical device. An energy storage device may include one or more devices connected in parallel or series in various configurations to obtain a desired storage capacity, output voltage, and/or output current. Such a combination of one or more devices may include one or more forms of stored energy. In another example, the energy storage device can include other technologies for storing energy, such as devices that store energy through performing chemical reactions (e.g., fuel cells), trapping electrical charge, storing electric fields (e.g., capacitors, variable capacitors, ultracapacitors, and the like), and/or storing kinetic energy (e.g., rotational energy in flywheels).

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Materials and Instrumentation

Graphite, sodium nitrate ($NaNO_3$), potassium permanganate ($KMnO_4$), sulfuric acid ($H_2SO_4$), and benzyl alcohol were obtained from Fisher Chemicals (U.S.A.), Dow epoxy resin 332 (DER 332), isophoronediamine (IPDA), diaminocyclohexane (DACH), diethylenetriamine (DETA), aminoethylpiperazine (AEP), piperazine (PIP), monoethanolamine (MEA), 2,4,6-Tris(dimethylaminomethyl)phenol (DMP-30), chloroauric acid ($HAuCl_4$), chloroplatinic acid ($H_2PtCl_6$), tin chloride ($SnCl_4$), dihydrogentetrachloropalladium ($H_2PdCl_4$), sodium borohydride ($NaBH_4$), magnesium nitrate ($Mg(NO_3)_2$), aluminum nitrate ($Al(NO_3)_3$), sodium hydroxide (NaOH), and sodium carbonate ($Na_2CO_3$) were obtained from Sigma-Aldrich® (U.S.A.), alumina nanoparticles were obtained Optical microscopy was performed using a Carl Zeiss Microscope, Axio Imager M2m (Zeiss Group, GERMANY). Scanning Electron Microscopy (SEM) and Energy Dispersive Spectroscopy (EDS) were performed using a JEOL 7800F (JEOL U.S.A., Inc., U.S.A).

Example 1

Preparation of Graphene Oxide

Graphene oxide flakes were prepared by modification of known literature methods (e.g., Hummers et al., *J. Am. Chem. Soc.*, 1958, 80, 1339-1339, which is incorporated by reference) and thermal exfoliation. Graphite flakes (10 mesh, 10-20 gm) were added to the reaction vessel, followed by $NaNO_3$ (10-20 gm). The reaction vessel was lowered into an ice bath, and 98% $H_2SO_4$ was slowly added to the reaction vessel. The mixture was vigorously agitated for 10-15 min. Subsequently, of $KMnO_4$ (10-15 gm) was slowly added to the agitated mixture, and the temperature was maintained below 20° C. After the addition, the ice bath was removed and the temperature was allowed to rise up to 70-80° C., and held for 10 min. The resulting black colored suspension was diluted with water, centrifuged, and washed multiple (about 3) times. The obtained washed precipitate was heated slowly to 120-150° C., which exfoliated the graphene oxide structures (flakes).

Example 2

Folding of Graphene Oxide Structures

A stable dispersion of graphene oxide in benzyl alcohol was prepared by dispersing the graphene oxide (Example 1, 1.4 g) in benzyl alcohol (1 liter (L)). A monomer composition (Solution A) of 50:50 weight ratio of DER 332:benzyl alcohol was prepared. An amine solution (Solution B) containing MEA (68.6 wt. %), PIP (14.7 wt. %), AEP (14.7 wt. %), DMP-30 (2 wt. %) blend was prepared. Benzyl alcohol (10 mL) was added to Solution B (10 mL) to a form homogeneous solution having a 50:50 volumetric ratio of solution B to benzyl alcohol (diluted solution B). Solution A (4 g) and Solution B (1 g) were combined to form Solution C having a 4:1 mass ratio of monomer to curing agent.

Figure 6A:
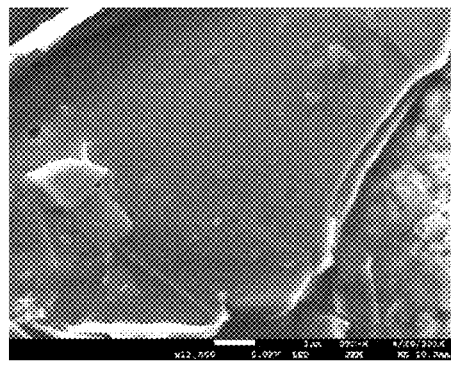
FIG. 6A is a scanning electron microscopy (SEM) image of the coated flat (unassembled) graphene-based structure of the present invention after curing, but prior to quenching.
Figure 6B:
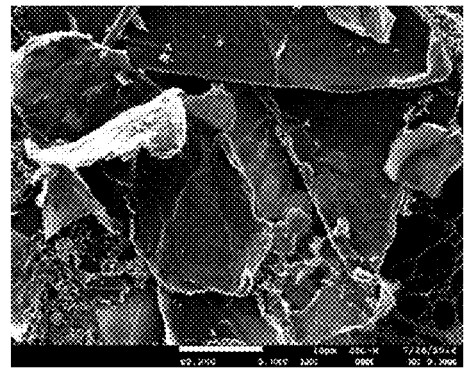
FIGS. 6B-6F are SEM images of the self-assembled graphene-based materials of the present invention after the curable organic material has been cured for various times and then quenched.
Figure 6C:
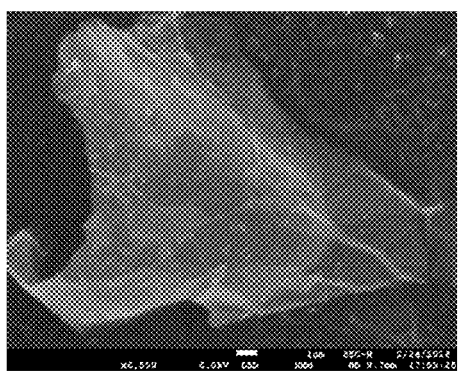
Figure 6D:
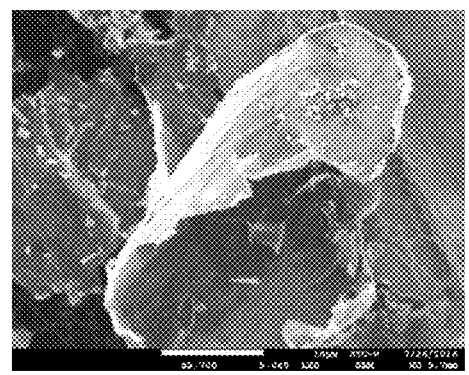
Figure 6E:
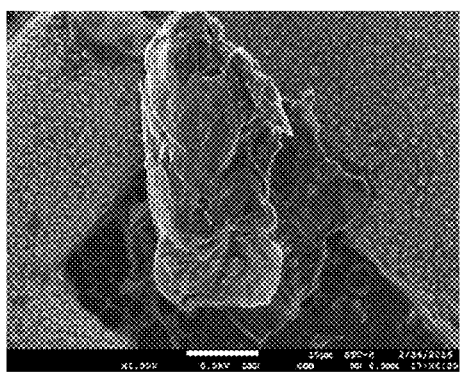
Figure 6F:
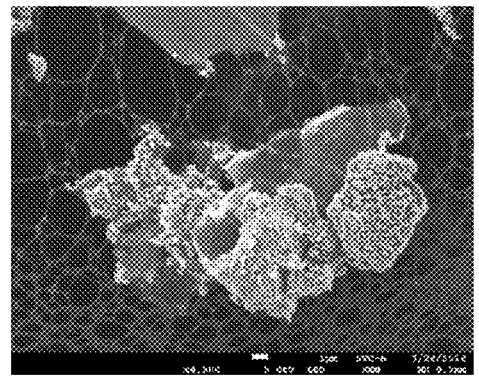
Figure 7:
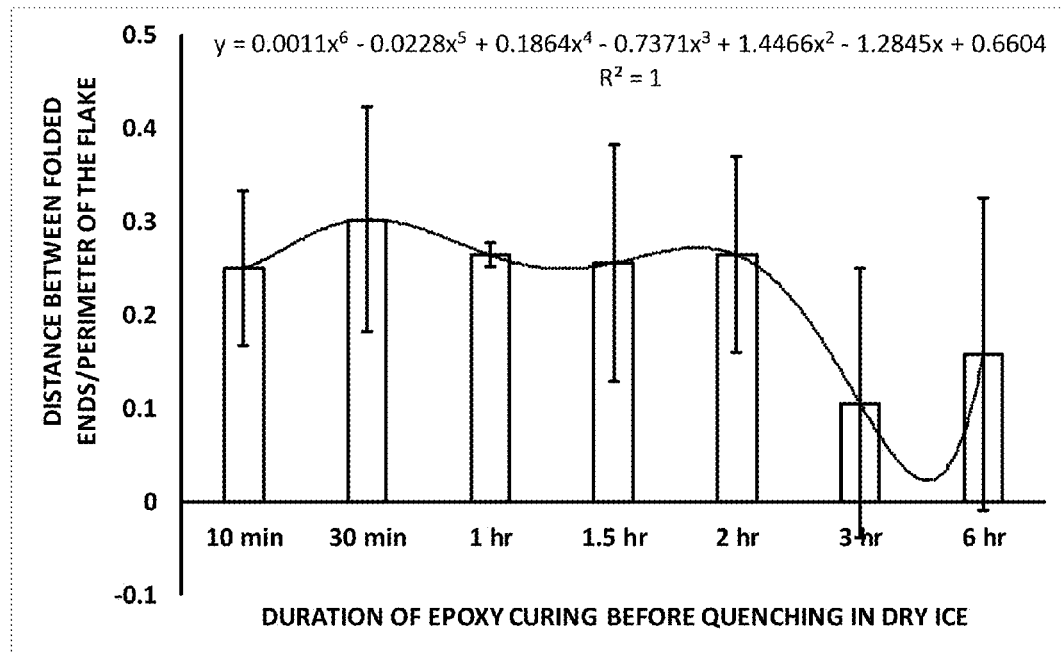
FIG. 7 shows the relationship between time of curing and folding of the graphene-based materials of the present invention.
Figure 8:
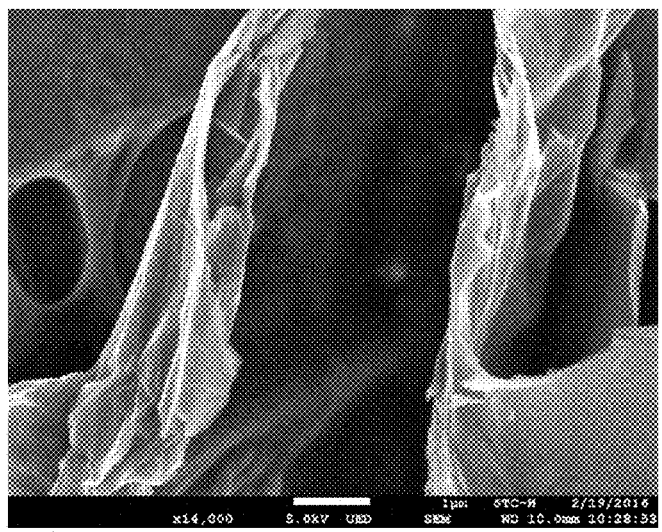
FIG. 8 is a SEM image of the self-assembled graphene-base structure of the present invention after 30 days.
Figure 9:
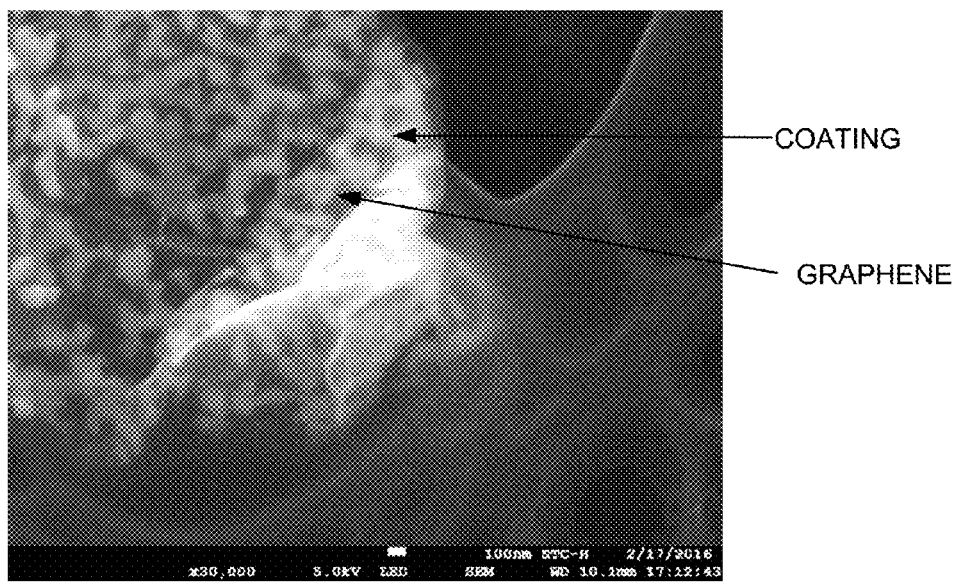
FIG. 9 is a SEM image of the self-assembled graphene-base structure of the present invention showing partial coating of the graphene-based structure.

A portion (10-12 g) of the stable graphene oxide dispersion (1.4 g/L) was sonicated and, then heated at 120° C. To the heated graphene oxide dispersion, Solution C (about 2 mL) was added. The resulting solution was heated for until the monomer was sufficiently cured (e.g., cross-linked after about 10 min to 6 hrs). After curing was determined to be complete (e.g., about 3 hours), the reaction was quenched by rapidly cooling the reaction vessel in a solid $CO_2$/acetone bath for 10-15 min. It was observed that that the curing time had an effect on the self-assembling of the graphene-based structures after quenching. Referring to FIG. 6A no folding is observed prior to quenching as the graphene-based structure is substantially planar or flat. Referring to FIGS. 6B-6F, it was determined that more complete folding occurred after longer periods of curing time. FIG. 6B (10 min), FIG. 6C (30 min), FIG. 6D (1 h), FIG. 6E (3 h), FIG. 6F (6 h). FIG. 7 depicts graphical representations of the amount of folding that occurred based on the time of curing. From the data and the SEM images, it was determined that a curing time of 3 hours or more produced completely self-assembled graphene-based structures. The resulting solid (self-assembled 2D architecture) was separated from benzyl alcohol by washing and centrifuging at 3000-4000 rpm for 1 hr. The collected solid was dried in room temperature to produce a hollow graphene shell. The hollow graphene shell maintained its self-assembled (folded) shaped days after being made (See, FIG. 8). FIG. 9 is a SEM image of the self-assembled shell showing patches of the cured epoxy resin coating.

Example 3

Method of Producing an Alumina Core/Graphene Shell Structure

A portion (10-12 g) of the stable dispersion (1.4 g/L, Example 2), alumina nanoparticles (10 to 15 mg, or about 10.5 mg) was sonicated and heated at 120° C. To the heated graphene oxide/alumina nanoparticle dispersion, Solution C (about 2 ml) was added. The resulting solution was heated until the monomer composition was sufficiently cured (about 3 hours). After curing, the reaction was quenched by rapidly cooling the reaction vessel in a solid $CO_2$/acetone bath for 10-15 min. The resulting solid (self-assembled 2D architecture) was separated from benzyl alcohol by washing and centrifuging at 3000-4000 rpm for 1 hr. The collected solid was dried in room temperature to produce an alumina core/graphene shell (See, FIG. 10).

Example 4

Method of Producing a Graphene Shell Structure with Nanostructures

A portion (10-12 g) of the stable dispersion (1.4 g/L, Example 2), sonicated and heated at 120° C. To the heated graphene oxide/alumina nanoparticle dispersion, Solution C (about 2 ml) was added. The resulting solution was heated until a significant amount of curing had occurred (about 1 to 6 hours), and then 15 to 20 minutes prior to the end of the curing a metal nanostructure precursor material was added to the hot mixture. Table 1 lists the metal nanostructure precursor material and the amounts added. The resulting solution was heated for 15 to 20 min to convert the metal nanostructure precursor material to a metal nanostructure. After curing was determined to be complete, the reaction was quenched by rapidly cooling the reaction vessel in a solid $CO_2$/acetone bath for 10-15 min. The resulting solid (self-assembled 2D architecture) was separated from benzyl alcohol by washing and centrifuging at 3000-4000 rpm for 1 hr. The collected solid was dried at room temperature to produce a hollow graphene shell with metal nanoparticles on the surface of the shell.

Example 5

Figure 11:
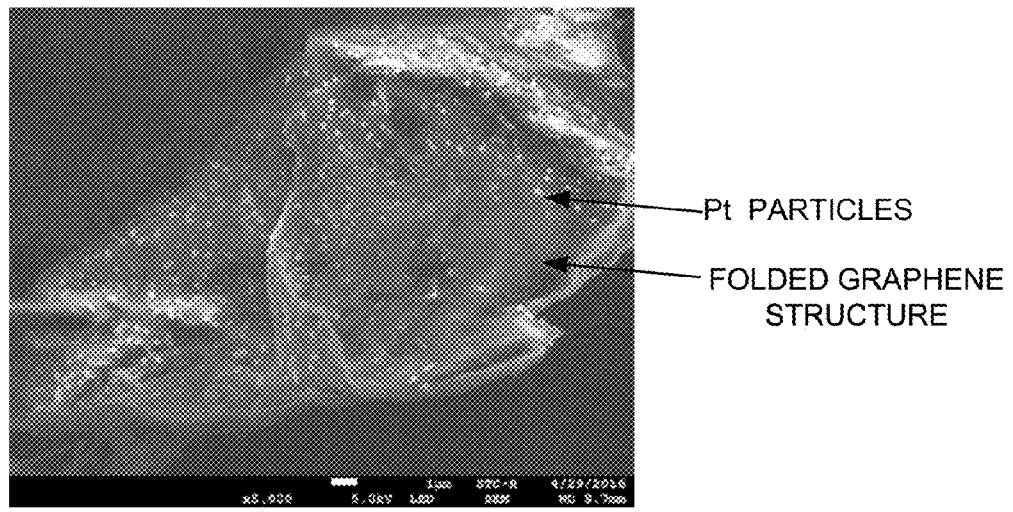
FIG. 11 is a SEM image of the self-assembled graphene-based shell material of the present invention with platinum nanoparticles.

Method of Producing an Alumina Core/Graphene Shell Structure with Metal Nanoparticles A portion (10-12 g) of the stable dispersion (1.4 g/L, Example 2), alumina nanoparticles (10 to 15 mg, or about 10.5 mg) was sonicated and heated at 120° C. To the heated graphene oxide/alumina nanoparticle dispersion, Solution C (about 2 ml) was added. The resulting solution was heated until curing was determined to be significant (for 1 to 6 hours) and then 15 to 20 minutes prior to the end of the curing time a metal nanostructure precursor material was added to the hot mixture. Table 1 lists the metal nanostructure precursor material and the amounts added. The resulting solution was heated for 15 to 20 min to convert the metal nanostructure precursor material to a metal nanostructure. After curing was determined to be complete, the reaction was quenched by rapidly cooling the reaction vessel in a solid $CO_2$/acetone bath for 10-15 min. The resulting solid (self-assembled 2D architecture) was separated from benzyl alcohol by washing and centrifuging at 3000-4000 rpm for 1 hr. The collected solid was dried in room temperature to produce an alumina core/graphene shell with metal nanoparticles on the surface of the shell. FIG. 11 is a SEM image the $Al_2O_3$ core/Pt graphene-based structure showing the Pt nanoparticles on the surface of the self-assembled graphene.

TABLE 1

| Metal Nanostructure Precursor Material | Example 4 (g) | Example 5 (g) | Example 7 (g) |
|---|---|---|---|
| $HAuCl_4$ | $4.8 \times 10^{-3}$ | $4.8 \times 10^{-3}$ | $4.8 \times 10^{-3}$ |
| $H_2PtCl_6$ | $2.6 \times 10^{-3}$ | $2.6 \times 10^{-3}$ | $2.6 \times 10^{-3}$ |
| $SnCl_4$ | $4 \times 10^{-3}$ | $4 \times 10^{-3}$ | $4 \times 10^{-3}$ |
| $H_2PdCl_4$ | $1.9 \times 10^{-3}$ | $1.9 \times 10^{-3}$ | $1.9 \times 10^{-3}$ |

Example 6

Method of Producing an Alumina Core/Graphene Shell/MgAlO Shell Structure

Figure 12:
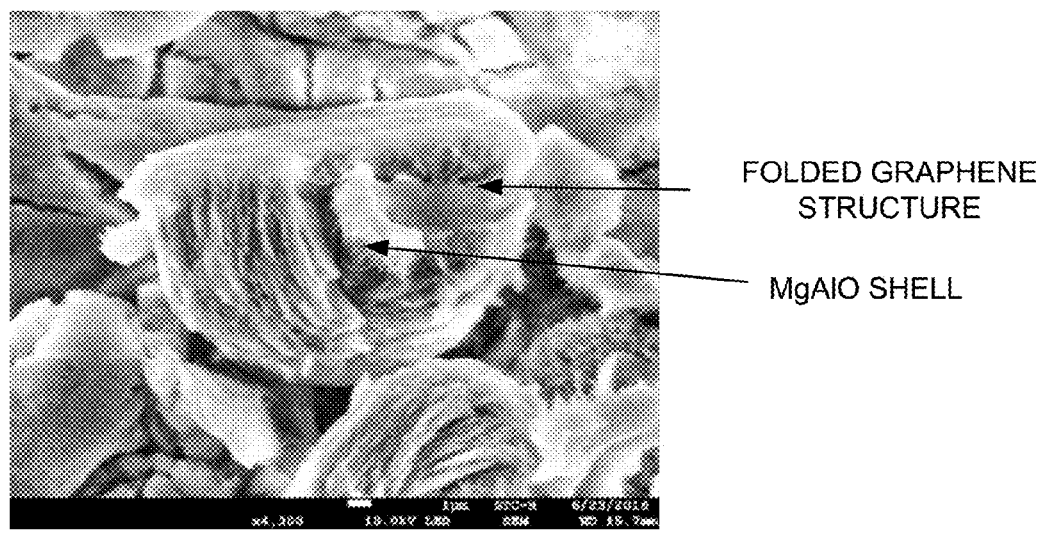
FIG. 12 is a SEM image of the alumina core/graphene-based shell/MgAlO shell structure of the present invention.

The prepared folded architecture (Example 3) was mixed with water (20-50 mL). This was further mixed with magnesium nitrate ($Mg(NO_3)_2$) and aluminum nitrate ($Al(NO_3)_3$) (Mg/Al mole ratio of about 5). The solution was mixed well and subsequently, sodium carbonate ($Na_2CO_3$, 10-20 mg) and sodium hydroxide (NaOH, 100-150 mg) were added at 60° C. The final mixture was aged at room temperature for overnight. The aged solution was calcined in air at 500-700° C. FIG. 12 is an SEM image of the alumina core/graphene shell/MgAlO Shell Structure.

Example 7

Figure 13:
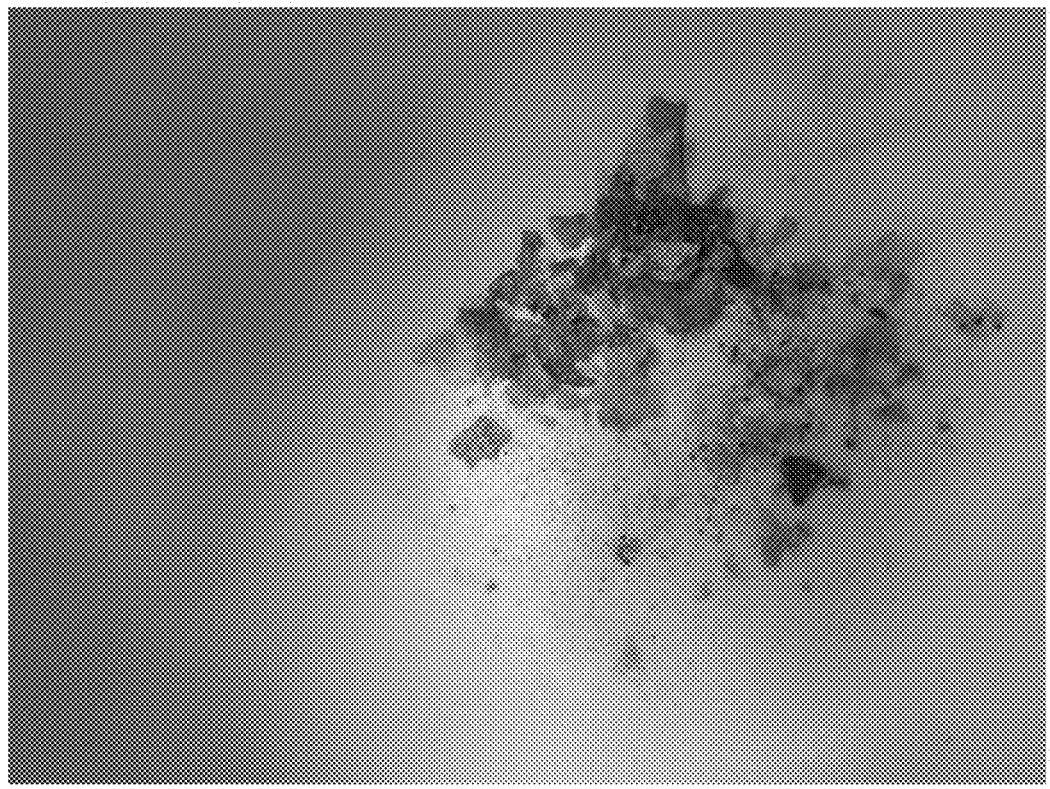
FIG. 13 is a photograph of the alumina core nanoparticles encapsulated within graphene oxide flakes (folded), decorated with Pt nanoparticles, and encapsulated by calcined hydrotalcite (MgAlO) shell.

Method of Producing an Alumina Core/Graphene Shell/MgAlO Shell and Nanoparticles Structure The prepared folded architecture(s) (Example 5) was mixed with water (20-50 mL). Table 1 lists the amounts of nanoparticles used. This was further mixed with magnesium nitrate ($Mg(NO_3)_2$) and aluminum nitrate ($Al(NO_3)_3$) (Mg/Al mole ratio of about 5). The solution was mixed well and subsequently, sodium carbonate ($Na_2CO_3$, 10-20 mg) and sodium hydroxide (NaOH, 100-150 mg) were added at 60° C. The final mixture was aged at room temperature for overnight. The aged solution was calcined in air at 500 to 700° C. to remove the water and convert the Mg/Al precursor material to oxides. Elemental analysis of each compound was confirmed by energy-dispersive X-ray spectroscopy. FIG. 13 is a photograph of the alumina core nanoparticles encapsulated within graphene oxide flakes (folded), decorated with Pt nanoparticles, and encapsulated by calcined hydrotalcite (MgAlO) shell.

Example 8

Method of Producing an Alumina Core/Graphene Shell/MgAlO Shell/MgAlO Shell

The prepared folded architecture (Example 6) were mixed with water (20-50 mL). This was further mixed with magnesium nitrate ($Mg(NO_3)_2$) and aluminum nitrate ($Al(NO_3)_3$) (Mg/Al mole ratio of about 5) overnight. The salt-coated architectures were washed, separated by using centrifuge and dried overnight at room temperature. Followed by drying, the salt-coated architectures were mixed in a water (10-50 mL), heated to about 60° C., and a solution of sodium carbonate ($Na_2CO_3$, 10-20 mg) and sodium hydroxide (NaOH, 100-150 mg), was slowly added. The final mixture was aged at room temperature for overnight. The final mixture was aged at room temperature for overnight. Finally, the architectures were washed, centrifuged, and dried in an oven for overnight (80° C.). The dried samples were calcined in air at about 700° C.

Example 9

Method of Producing an Graphene Shell-2 Step Process

Figure 14:
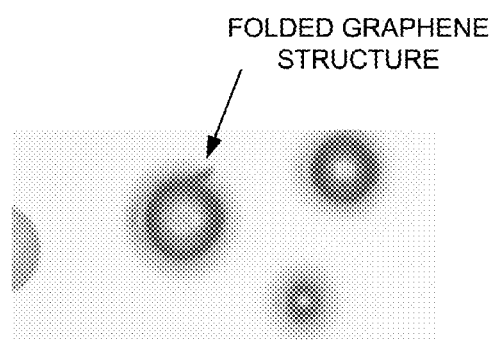
FIG. 14 is a SEM image of the folded graphene-based shell material of the present invention made from a two pot (spin-coating) method.

A first solution of an 80:20 weight ratio of DER 332 and benzyl alcohol was prepared. A second solution of AEP and DMP-30 in a weight ratio of 98:2 was prepared. The two solutions were combined. A silicon wafer was spin-coated the combined solution at 500 rpm (2 sec) and 5000 rpm (30 sec) to produce an epoxy coated silicon wafer. The coated wafer was cured at room temperature for 24 hours and then placed in a furnace and heated from 25° C. to 120° C. at a temperature ramp of 20° C. and held for 300 minutes. The cured coated wafer was analyzed using an optical microscopy. FIG. 14 is an SEM image showing folding of the graphene structure.

The invention claimed is:

1. A method for making a core/graphene-based shell structure, the method comprising:
  (a) obtaining a composition comprising core nano- or microstructures and graphene-based structures having at least a portion of a surface coated with a curable organic material, wherein the core nano- or microstructures and graphene-based structures are dispersed throughout the composition; and
  (b) curing the organic material and optionally quenching the composition to allow the graphene-based structures to self-assemble around the core nano- or microstructures to produce a core/graphene-based shell structure comprising a graphene-based shell encompassing a core nano- or microstructure.

2. The method of claim 1, wherein the curable organic material comprises a curable monomer or a curable polymer, or a combination thereof.

3. The method of claim 2, wherein step (b) comprises:
  (i) subjecting the composition to conditions sufficient to cure the organic material and form polymer coated graphene-based structures; and
  (ii) quenching the composition such that the polymer coated graphene based structures self-assemble to form a graphene-based shell structure.

4. The method of claim 3, wherein the conditions sufficient to cure the organic material and form polymer coated graphene-based structures comprise heating the composition to a temperature of 15° C. to 400° C.

5. The method of claim 4, wherein quenching the composition comprises cooling the composition to 25° C. or less.

6. The method of claim 1, wherein the core nanostructure comprises a metal, a metal oxide, a metal alloy, a bimetallic metal, a trimetallic metal, a nitride compound, a chalcogenide, a quantum dot, or combinations thereof.

7. The method of claim 1, further comprising (c) adding a nano- or microstructure precursor solution to the composition in either of steps (a) and/or (b) and forming second nano- or microstructures on a surface of the graphene-based structures.

8. The method of claim 7, wherein the nano- or microstructure precursor solution is added during step (a) and the second nano- or microstructures are formed on the polymer coated graphene-based structures prior to or during step (b).

9. The method of claim 7, wherein the nano- or microstructure precursor solution is added during step (b) and second nano- or microstructures are formed on the graphene-based structures and/or on the graphene-based shell during step (b).

10. The method of claim 9, wherein the nano- or microstructure precursor solution comprises benzyl alcohol and the nano- or microstructure precursors are metal salts, and the benzyl alcohol converts the metal salts to metal nano- or microstructures during step (b).

11. The method of claim 7, wherein the nano- or microstructures comprise a noble metal selected from the group consisting of silver (Ag), palladium (Pd), platinum (Pt), gold (Au), rhodium (Rh), ruthenium (Ru), rhenium (Re), or iridium (Ir), or any combinations or alloys thereof.

12. The method of claim 7, wherein the nano- or microstructures comprise a transition metal selected from the group consisting of copper (Cu), iron (Fe), nickel (Ni), zinc (Zn), manganese (Mn), chromium (Cr), molybdenum (Mo), tungsten (W), osmium (Os), or tin (Sn), or any combinations or alloys thereof.

13. The method of claim 7, wherein the produced core/graphene-based shell structure having nano- or microstructures on the surface of the graphene-based shell is dispersed in a second composition comprising additional graphene-based structures having at least a portion of their surfaces coated with a curable organic material and curing the organic material and optionally quenching the second composition to allow the additional graphene-based structures to self-assemble around the produced core/graphene-based shell structure to produce a core/graphene-based shell/nanoparticle/graphene-based shell structure.

14. The method of claim 1, wherein a carbon species is added to the composition in step (a) and/or step (b) to increase the porosity of the graphene-based shell.

15. The method of claim 14, wherein the carbon species is a hydrocarbon, a sugar-based compound, a sulfonated carbon compound, nitrogen-based carbon compound, carbon-based monomer, aromatic compound, a metal-complexed carbon-based compound, or any combination thereof.

16. The method of claim 1, further comprising forming a second shell that encompasses the graphene-based shell structure.

17. The method of claim 16, wherein the second shell is a metal oxide or mixed metal oxide shell, preferably a hydrotalcite shell.

18. The method of claim 17, wherein the second shell has a mesoporous or macroporous structure, preferably a mesoporous structure.

19. A method for making a graphene-based shell structure, the method comprising:
   (a) obtaining a composition comprising a curable organic material and graphene-based structures dispersed throughout the composition;
   (b) subjecting the composition to conditions sufficient to cure the organic material and form polymer coated graphene-based structures; and
   (c) quenching the composition such that the polymer coated graphene-based structures self-assemble to form a graphene-based shell structure.

20. A multilevel shell structure comprising:
   a graphene-based shell having a void space defined by the inner surface of the graphene-based shell, wherein metallic nano- or microstructures are dispersed on the outer, inner or both surfaces of the graphene-based shell; and
   a calcined hydrotalcite shell that encompasses the graphene-based shell and dispersed metallic nanostructures.

* * * * *